US010341884B2

(12) United States Patent
Sun et al.

(10) Patent No.: US 10,341,884 B2
(45) Date of Patent: Jul. 2, 2019

(54) CHANNEL CLEARANCE TECHNIQUES USING SHARED RADIO FREQUENCY SPECTRUM BAND

(71) Applicant: QUALCOMM Incorporated, San Diego, CA (US)

(72) Inventors: Jing Sun, San Diego, CA (US); Tao Luo, San Diego, CA (US); Xiaoxia Zhang, San Diego, CA (US); Taesang Yoo, Riverside, CA (US); Siddhartha Mallik, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 126 days.

(21) Appl. No.: 15/182,273

(22) Filed: Jun. 14, 2016

(65) Prior Publication Data
US 2017/0013479 A1   Jan. 12, 2017

Related U.S. Application Data

(60) Provisional application No. 62/189,697, filed on Jul. 7, 2015.

(51) Int. Cl.
*H04W 24/02* (2009.01)
*H04L 27/26* (2006.01)
(Continued)

(52) U.S. Cl.
CPC .......... *H04W 24/02* (2013.01); *H04B 7/0632* (2013.01); *H04L 27/2601* (2013.01);
(Continued)

(58) Field of Classification Search
None
See application file for complete search history.

(56) References Cited

U.S. PATENT DOCUMENTS

2010/0008315 A1* 1/2010 Palanki ............... H04W 72/082
370/329
2010/0227569 A1* 9/2010 Bala ..................... H04L 5/0007
455/73

(Continued)

OTHER PUBLICATIONS

ISA/EP, International Search Report and Written Opinion of the International Searching Authority, Int'l Application No. PCT/US2016/037530, dated Sep. 13, 2016, European Patent Office, Rijswijk, NL, 9 pgs.

*Primary Examiner* — George C Atkins
(74) *Attorney, Agent, or Firm* — Holland & Hart LLP

(57) ABSTRACT

Channel clearance using a shared radio frequency spectrum band may be performed for both a base station and a user equipment (UE). A base station may perform a listen before talk (LBT) procedure and verify one or more channels in a shared radio frequency spectrum band are available for transmissions and, if the LBT procedure is successful, transmit a pre-grant transmission to one or more UEs. The UEs may perform an LBT procedure for channel(s) indicated in the pre-grant transmission. If the UE LBT procedure passes, the UE may transmit a channel clearance signal, and may transmit a feedback communication responsive to the pre-grant transmission. The feedback communication may indicate, for example, the pre-grant transmission was received and which of the one or more channels are available based on the LBT procedure. The base station may receive the feedback communication and initiate transmissions to the UE.

29 Claims, 17 Drawing Sheets

(51) Int. Cl.

| | |
|---|---|
| *H04W 28/04* | (2009.01) |
| *H04W 24/08* | (2009.01) |
| *H04W 74/06* | (2009.01) |
| *H04W 28/02* | (2009.01) |
| *H04W 74/00* | (2009.01) |
| *H04B 7/06* | (2006.01) |
| *H04W 74/08* | (2009.01) |
| *H04W 72/08* | (2009.01) |

(52) U.S. Cl.
 CPC ....... *H04W 24/08* (2013.01); *H04W 28/0236* (2013.01); *H04W 74/0808* (2013.01); *H04W 72/085* (2013.01)

(56) References Cited

U.S. PATENT DOCUMENTS

| | | | |
|---|---|---|---|
| 2012/0039284 A1* | 2/2012 | Barbieri | H04W 48/10 370/329 |
| 2012/0207040 A1* | 8/2012 | Comsa | H04W 72/1215 370/252 |
| 2015/0023315 A1 | 1/2015 | Yerramalli et al. | |
| 2015/0049715 A1* | 2/2015 | Yerramalli | H04L 5/1469 370/329 |
| 2015/0092755 A1* | 4/2015 | Ling | H04W 72/042 370/336 |
| 2015/0110066 A1 | 4/2015 | Gaal et al. | |
| 2015/0172950 A1* | 6/2015 | Chen | H04W 16/14 370/252 |
| 2016/0242186 A1* | 8/2016 | Nissila | H04L 5/001 |
| 2016/0278050 A1* | 9/2016 | Nory | H04W 16/14 |
| 2017/0048041 A1* | 2/2017 | Yi | H04L 5/0048 |
| 2017/0257890 A1* | 9/2017 | Biswas | H04W 74/0816 |
| 2017/0339693 A1* | 11/2017 | Cierny | H04W 16/14 |

\* cited by examiner

1600

CHANNEL CLEARANCE TECHNIQUES USING SHARED RADIO FREQUENCY SPECTRUM BAND

CROSS REFERENCES

The present Application for Patent claims priority to U.S. Provisional Patent Application No. 62/189,697 by Sun et al., entitled "Channel Clearance Techniques Using Shared Radio Frequency Spectrum Band," filed Jul. 7, 2015, assigned to the assignee hereof.

BACKGROUND

The following relates generally to wireless communication, and more specifically to channel clearance techniques using shared radio frequency spectrum band.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations, each simultaneously supporting communication for multiple communication devices, which may be otherwise known as user equipment (UE).

In some wireless communication systems, base stations and UEs may communicate over a radio frequency spectrum band using different types of component carriers (CCs), such as enhanced component carriers (eCCs) or non-eCCs. When base stations and UEs communicating via different types of CCs share a radio frequency spectrum band, or when base stations and UEs share a radio frequency spectrum band with devices using other types of communications, techniques may be employed to avoid, mitigate, or cancel interference caused by use of the different types of CCs or communication technologies. For example, devices using a shared radio frequency spectrum band may perform a listen-before-talk (LBT) procedure in which a device, such as a UE or a base station, may monitor a channel to identify whether any other devices are transmitting on the channel, and use the channel for transmission if the channel is clear. When transmitting between a base station and one or more UEs, each device may experience different channel conditions, and in some cases a base station may determine a channel is clear when a UE may experience interference from another device on the channel.

SUMMARY

The present disclosure, for example, relates to techniques for providing channel clearance techniques using a shared radio frequency spectrum band. Various aspects of the disclosure provide that both a base station and a UE may determine channel conditions prior to transmissions on a channel. In some examples, a base station may perform a listen-before-talk (LBT) procedure and verify one or more channels in a shared radio frequency spectrum band are available for transmissions. If the LBT procedure is successful, the base station, may transmit a pre-grant transmission to one or more UEs in which the UE(s) are indicated to perform an LBT procedure on one or more channels. The UE may perform an LBT procedure for the indicated channel(s) based on the pre-grant transmission. If the UE LBT procedure passes, the UE may transmit a channel clearance signal and may transmit a feedback communication responsive to the pre-grant transmission. The feedback communication may indicate, for example, the pre-grant transmission was received and which of the one or more channels are available based on the LBT procedure. The base station may receive the feedback communication responsive to the pre-grant transmission and initiate transmissions to the UE based on the feedback communication.

A method of wireless communication is described. The method may include performing, by a wireless device, an LBT procedure, receiving a pre-grant transmission indicating one or more channels for a downlink transmission and a length of the downlink transmission, transmitting a channel clearance signal based at least in part on the LBT procedure, and transmitting a feedback communication responsive to the pre-grant transmission, the feedback communication indicating the pre-grant transmission was received and which of the one or more channels are available based on the LBT procedure.

An apparatus for wireless communication is described. The apparatus may include means for performing, by a wireless device, an LBT procedure, means for receiving a pre-grant transmission indicating one or more channels for a downlink transmission and a length of the downlink transmission, means for transmitting a channel clearance signal based at least in part on the LBT procedure, and means for transmitting a feedback communication responsive to the pre-grant transmission, the feedback communication indicating the pre-grant transmission was received and which of the one or more channels are available based on the LBT procedure.

A further apparatus for wireless communication at a wireless device is described. The apparatus may include a processor, memory in electronic communication with the processor, and instructions stored in the memory, wherein the instructions are executable by the processor to perform, by a wireless device, an LBT procedure, receive a pre-grant transmission indicating one or more channels for a downlink transmission and a length of the downlink transmission, transmit a channel clearance signal based at least in part on the LBT procedure, and transmit a feedback communication responsive to the pre-grant transmission, the feedback communication indicating the pre-grant transmission was received and which of the one or more channels are available based on the LBT procedure.

A non-transitory computer-readable medium storing code for wireless communication at a wireless device is described. The code may include instructions executable to perform an LBT procedure, receive a pre-grant transmission indicating one or more channels for a downlink transmission and a length of the downlink transmission, transmit a channel clearance signal based at least in part on the LBT procedure, and transmit a feedback communication responsive to the pre-grant transmission, the feedback communication indicating the pre-grant transmission was received and which of the one or more channels are available based on the LBT procedure.

Some examples of the method, apparatuses, or non-transitory computer-readable medium described above may further include transmitting the channel clearance signal using a first waveform type, and transmitting the feedback communication using a second waveform type, the second waveform type is different from the first waveform type. Additionally or alternatively, in some examples the first waveform type is a Wi-Fi waveform, and the second waveform type is an orthogonal frequency division multiplexing (OFDM) waveform.

Some examples of the method, apparatuses, or non-transitory computer-readable medium described above may further include selecting a transmission power of the channel clearance signal to clear Wi-Fi transmitters within a neighborhood of the wireless device, and selecting a transmission power of the feedback communication to transmit the feedback communication to a base station that generated the pre-grant transmission. Additionally or alternatively, in some examples the transmission power of the channel clearance signal is selected based on one or more of an area of the neighborhood of the wireless device or a channel quality requirement of the downlink transmission.

Some examples of the method, apparatuses, or non-transitory computer-readable medium described above may further include receiving the downlink transmission. Additionally or alternatively, in some examples the pre-grant transmission indicates two or more channels, and the downlink transmission is received on fewer than all of the channels indicated in the pre-grant transmission.

In some examples of the method, apparatuses, or non-transitory computer-readable medium described above, the downlink transmission comprises a downlink grant indicating a channel assignment and downlink data. Additionally or alternatively, in some examples the feedback communication further comprises channel quality information (CQI).

Some examples of the method, apparatuses, or non-transitory computer-readable medium described above may further include skipping a transmission of the channel clearance signal and the feedback communication when the LBT procedure indicates each of the one or more channels is occupied. Additionally or alternatively, some examples may include determining the absence of interference for one or more channels for a defined time period, and transmitting an indication to discontinue the pre-grant transmissions.

Some examples of the method, apparatuses, or non-transitory computer-readable medium described above may further include determining that the feedback communication is a clear channel exempt transmission (CET), skipping the LBT procedure, transmitting the channel clearance signal, and transmitting the feedback communication. Additionally or alternatively, some examples may include monitoring channel clearance signals and their power levels for one or more channels, estimating a future interference level using a duration indicated in the detected channel clearance signals and their power levels, and the transmitting the feedback communication is further responsive to the estimating the future interference level.

In some examples of the method, apparatuses, or non-transitory computer-readable medium described above, the monitoring comprises monitoring Wi-Fi preambles, and wherein the estimating comprises aggregating interference levels and length information associated with the Wi-Fi preambles.

Another method of wireless communication is described. The method may include transmitting a channel clearance signal having a length indication based at least in part on a pre-grant transmission and acknowledgment length and a radio frame transmission length, transmitting the pre-grant transmission indicating one or more channels for a downlink transmission and a length of the downlink transmission, and receiving a feedback communication responsive to the pre-grant transmission, the feedback communication indicating the pre-grant transmission was received and which of the one or more channels are available for the downlink transmission.

An apparatus for wireless communication at a wireless device is described. The apparatus may include means for transmitting a channel clearance signal having a length indication based at least in part on a pre-grant transmission and acknowledgment length and a radio frame transmission length, means for transmitting the pre-grant transmission indicating one or more channels for a downlink transmission and a length of the downlink transmission, and means for receiving a feedback communication responsive to the pre-grant transmission, the feedback communication indicating the pre-grant transmission was received and which of the one or more channels are available for the downlink transmission.

A further apparatus for wireless communication at a wireless device is described. The apparatus may include a processor, memory in electronic communication with the processor, and instructions stored in the memory, wherein the instructions are executable by the processor to transmit a channel clearance signal having a length indication based at least in part on a pre-grant transmission and acknowledgment length and a radio frame transmission length, transmit the pre-grant transmission indicating one or more channels for a downlink transmission and a length of the downlink transmission, and receive a feedback communication responsive to the pre-grant transmission, the feedback communication indicating the pre-grant transmission was received and which of the one or more channels are available for the downlink transmission.

A non-transitory computer-readable medium storing code for wireless communication at a wireless device is described. The code may include instructions executable to transmit a channel clearance signal having a length indication based at least in part on a pre-grant transmission and acknowledgment length and a radio frame transmission length, transmit the pre-grant transmission indicating one or more channels for a downlink transmission and a length of the downlink transmission, and receive a feedback communication responsive to the pre-grant transmission, the feedback communication indicating the pre-grant transmission was received and which of the one or more channels are available for the downlink transmission.

In some examples of the method, apparatuses, or non-transitory computer-readable medium described above, the channel clearance signal has a first waveform type and the pre-grant transmission has a second waveform type that is different than the first waveform type. Additionally or alternatively, in some examples the first waveform type is a Wi-Fi waveform, and the second waveform type is an orthogonal frequency division multiplexing (OFDM) waveform.

In some examples of the method, apparatuses, or non-transitory computer-readable medium described above, the pre-grant transmission indicates two or more channels for the downlink transmission, and wherein the method further comprises determining one or more channels of the two or more channels for transmitting the downlink transmission based at least in part on the feedback communication. Additionally or alternatively, some examples may include transmitting the downlink transmission using the determined one or more channels.

In some examples of the method, apparatuses, or non-transitory computer-readable medium described above, the downlink transmission is transmitted on fewer than all of the channels indicated in the pre-grant transmission. Additionally or alternatively, in some examples the feedback communication is received from a plurality of user equipment (UE) devices, and wherein the downlink transmission is transmitted to fewer than all of the UE devices that transmitted the feedback communication.

In some examples of the method, apparatuses, or non-transitory computer-readable medium described above, the feedback communication further comprises channel quality information (CQI). Additionally or alternatively, some examples may include determining a modulation and coding scheme (MCS) for the downlink communication based at least in part on the CQI.

Some examples of the method, apparatuses, or non-transitory computer-readable medium described above may further include identifying an absence of interference for one or more channels, and discontinuing the pre-grant transmissions. Additionally or alternatively, in some examples the identifying the absence of interference comprises receiving a communication from a wireless device indicating an absence of interference for a defined period of time.

Some examples of the method, apparatuses, or non-transitory computer-readable medium described above may further include determining that one or more user equipment (UE) to receive the pre-grant transmission does not indicate that one or more channels are available for transmission, and initiating a new pre-grant transmission directed to one or more different UEs.

Some examples of the method, apparatus, or non-transitory computer readable medium described above may further include that the LBT procedure is performed after receiving the pre-grant transmission and is based at least in part on the one or more channels indicated in the pre-grant transmission.

Some examples of the method, apparatus, or non-transitory computer readable medium described above may further include that the LBT procedure is performed before receiving the pre-grant transmission and that the LBT may further include periodically polling, by the wireless device, one or more channels in a shared radio frequency spectrum band to determine whether the one or more channels are available for transmissions.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
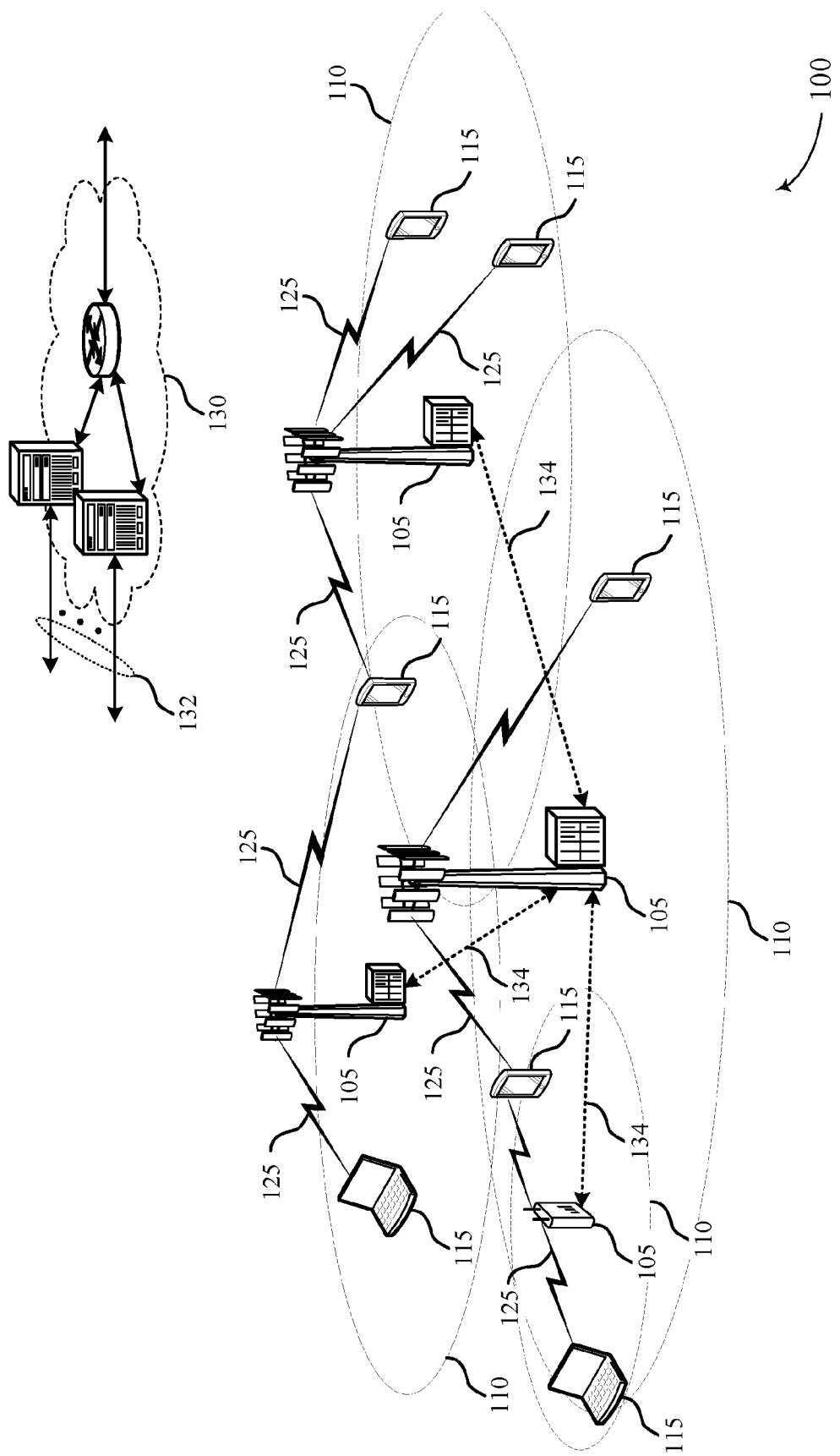
FIG. 1 illustrates an example of a wireless communications system that supports channel clearance techniques using shared radio frequency spectrum band in accordance with various aspects of the present disclosure.

Techniques are described in which a shared radio frequency spectrum band is used for at least a portion of communications over a wireless communication system. In some examples, the shared radio frequency spectrum band may be used for LTE/LTE-A communications. The shared radio frequency spectrum band may be used in combination with, or independent from, a dedicated radio frequency spectrum band. The dedicated radio frequency spectrum band may be a radio frequency spectrum band for which transmitting apparatuses may not contend for access because the radio frequency spectrum band is licensed to particular users (e.g., a licensed radio frequency spectrum band usable for LTE/LTE-A communications). The shared radio frequency spectrum band may be a radio frequency spectrum band for which a device may need to contend for access (e.g., a radio frequency spectrum band that is available for unlicensed use, such as Wi-Fi use, or a radio frequency spectrum band that is available for use by multiple operators in an equally shared or prioritized manner).

In some wireless systems, as discussed above, devices may perform a listen before talk (LBT) procedure to monitor the medium or channel for a period of time before sending data in order to prevent collisions. For example, such a LBT procedure may be a clear channel assessment (CCA). If the device senses that the channel is free, it may transmit a channel clearance signal to indicate to other devices that the medium or channel is occupied, and initiate a transmission using the medium or channel. In some examples, devices may transmit using an enhanced component carrier (eCC) that is transmitted using a shared radio frequency spectrum band, such as an unlicensed band coexisting with unlicensed technologies, such as communications using the IEEE 802.11 standard, referred to herein as Wi-Fi communications. In some deployments, a base station may initiate communications for a radio frame by performing a LBT procedure, sending a Wi-Fi "clear-to-send" (CTS) signal to clear devices in the neighborhood of the base station from transmitting during the radio frame, sending a channel usage beacon signal (CUBS) to help one or more UEs detect the downlink (DL) transmission. The base station may then transmit a physical frame format indicator channel (PFFICH) transmission to indicate to the UEs the structure of the radio frame, and then transmit the DL transmission, such may include, for example, physical downlink control channel (PDCCH) or physical downlink shared channel (PDSCH) transmissions.

A UE in such a system may be triggered by the CUBS and PFFICH to start receiving the DL transmission, and may report an acknowledgment of receipt of the transmission in an uplink (UL) portion of the radio frame. However, when the base station schedules a UE in the DL, it may not know if there is a hidden node that interferes with the UE reception. Such a hidden node may be, for example, a Wi-Fi node located in the neighborhood of the UE that may not receive the channel clearance signal from the base station. If such a node transmits during the DL portion of the radio frame, the UE may receive interference and not properly receive and decode the radio frame. Furthermore, the base station may transmit using a modulation and coding scheme (MCS) that is determined based on interference levels that do not take into account such interference and channel conditions at the UE.

As described herein, various aspects provide a dual transaction process by adding a short transmission for pre-grant transmission and acknowledgement, prior to radio frame transmissions, which may allow both a base station and a UE to determine channel conditions prior to transmissions on a channel. In some examples, a base station may perform a LBT procedure (e.g., a CCA) and verify one or more channels in a shared radio frequency spectrum band are available for transmissions. If the LBT procedure is successful, the base station may transmit a clearance signal that may be received by other devices in the neighborhood of the base station to indicate that the base station is reserving the channel for a period of time corresponding to a pre-grant transmission time period and a radio frame transmission time period. The base station may then transmit a pre-grant transmission to one or more UEs in which the UE(s) are indicated to perform a LBT procedure on one or more channels. The UE may perform an LBT procedure for the indicated channel(s), based on the pre-grant transmission. If the UE LBT procedure passes, the UE may transmit a channel clearance signal that may be received by other devices in the neighborhood of the UE to indicate that the UE is reserving the channel for a period of time corresponding to the pre-grant transmission time period and the radio frame transmission time period. The UE may then transmit a feedback communication responsive to the pre-grant transmission. The feedback communication may indicate, for example, the pre-grant transmission was received and which of the one or more channels are available based on the LBT procedure. The base station may receive the feedback communication responsive to the pre-grant transmission, and initiate transmissions to the UE based on the feedback communication.

Aspects of the disclosure are initially described in the context of a wireless communication system. Specific examples are then described for a pre-grant transmission and frame transmission process. These and other aspects of the disclosure are further illustrated by and described with reference to apparatus diagrams, system diagrams, and flowcharts that relate to CCA window adaptation.

FIG. 1 illustrates an example of a wireless communications system 100 in accordance with various aspects of the present disclosure. The wireless communications system 100 includes base stations 105, user equipment (UEs) 115, and a core network 130. In some examples, the wireless communications system 100 may be a Long Term Evolution (LTE)/LTE-advanced (LTE-a) network.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal, a handset, a user agent, a client, or some other suitable terminology. A UE 115 may also be a cellular phone, a wireless modem, a handheld device, a personal computer, a tablet, a personal electronic device, a machine type communication (MTC) device or the like.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

In some cases, wireless communications system 100 may utilize one or more enhanced component carriers (eCCs). An enhanced component carrier (eCC) may be characterized by one or more features including: flexible bandwidth, different transmission time interval (TTIs), and modified control channel configuration. In some cases, an eCC may be associated with a carrier aggregation (CA) configuration or a dual connectivity configuration (e.g., when multiple serving cells have a suboptimal backhaul link). An eCC may also be configured for use in unlicensed spectrum or shared spectrum (e.g., where more than one operator is licensed to use the spectrum). An eCC characterized by flexible bandwidth may include one or more segments that may be utilized by UEs 115 that do are not capable of monitoring the whole bandwidth or prefer to use a limited bandwidth (e.g., to conserve power).

In some cases, an eCC may utilize a different TTI length than other component carriers (CCs), which may include use of a reduced or variable symbol duration as compared with TTIs of the other CCs. The symbol duration may remain the same, in some cases, but each symbol may represent a distinct TTI. In some examples, an eCC may include multiple hierarchical layers associated with the different TTI lengths. For example, TTIs at one hierarchical layer may correspond to uniform 1 ms subframes, whereas in a second layer, variable length TTIs may correspond to bursts of short duration symbol periods. In some cases, a shorter symbol duration may also be associated with increased subcarrier spacing. In conjunction with the reduced TTI length, an eCC may utilize dynamic time division duplex (TDD) operation (i.e., it may switch from downlink (DL) to uplink (UL) operation for short bursts according to dynamic conditions).

Flexible bandwidth and variable TTIs may be associated with a modified control channel configuration (e.g., an eCC may utilize an enhanced physical downlink control channel (ePDCCH) for DL control information). For example, one or more control channels of an eCC may utilize frequency-division multiplexing (FDM) scheduling to accommodate flexible bandwidth use. Other control channel modifications include the use of additional control channels (e.g., for evolved multimedia broadcast multicast service (eMBMS) scheduling, or to indicate the length of variable length UL and DL bursts), or control channels transmitted at different intervals. An eCC may also include modified or additional hybrid automatic repeat request (HARM) related control information.

In some examples, both a base station 105 and a UE 115 may determine channel conditions prior to transmissions on a channel. In some examples, a base station 150 may perform a LBT procedure and verify one or more channels in a shared radio frequency spectrum band are available for transmissions. The base station 105, if the LBT procedure is successful, may transmit a pre-grant transmission to one or more UEs 115, in which the UE(s) 115 are indicated to perform a LBT procedure on one or more channels. A UE 115 may perform a LBT procedure for the indicated channel(s), based on the pre-grant transmission. If the LBT procedure passes at the UE 115, it may transmit a channel clearance signal, and may transmit a feedback communication responsive to the pre-grant transmission. The feedback communication may indicate, for example, the pre-grant transmission was received and which of the one or more channels are available based on the LBT procedure. The base station 105 may receive the feedback communication responsive to the pre-grant transmission, and initiate transmissions to the UE 115 based on the feedback communication.

In other examples, a UE 115 may determine channel conditions prior to receiving a pre-grant transmission from a base station 105. In these examples, the UE 115 may periodically perform a LBT procedure and verify that one or more channels in a shared radio frequency spectrum are available for transmissions. The UE 115 may periodically determine an energy level present on each of the one or more channels. If the energy level present on the one or more channels is below an energy threshold, the UE 115 may determine that the channel is available for transmission. After the UE 115 receives a pre-grant transmission, the UE 115 determines whether one of the one or more channels indicated in the pre-grant transmission are available for transmitting based at least in part on the periodic LBT procedures already performed by the UE 115. If at least one of the one or more channels indicated in the pre-grant transmission are available for transmission, the UE 115 may transmit a channel clearance signal without performing another LBT procedure. The UE 115 may also transmit a feedback communication responsive to the pre-grant transmission. The feedback communication may indicate, for example, the pre-grant transmission was received and which of the one or more channels are available. The base station 105 may receive the feedback communication responsive to the pre-grant transmission and initiate transmission to the UE 115 based on the feedback communication. If none of the one or more channels indicated in the pre-grant transmission are available for transmission based on the periodic LBT procedures already performed, the UE 115 may perform other LBT procedures based on the pre-grant transmission as already described above.

Figure 2:
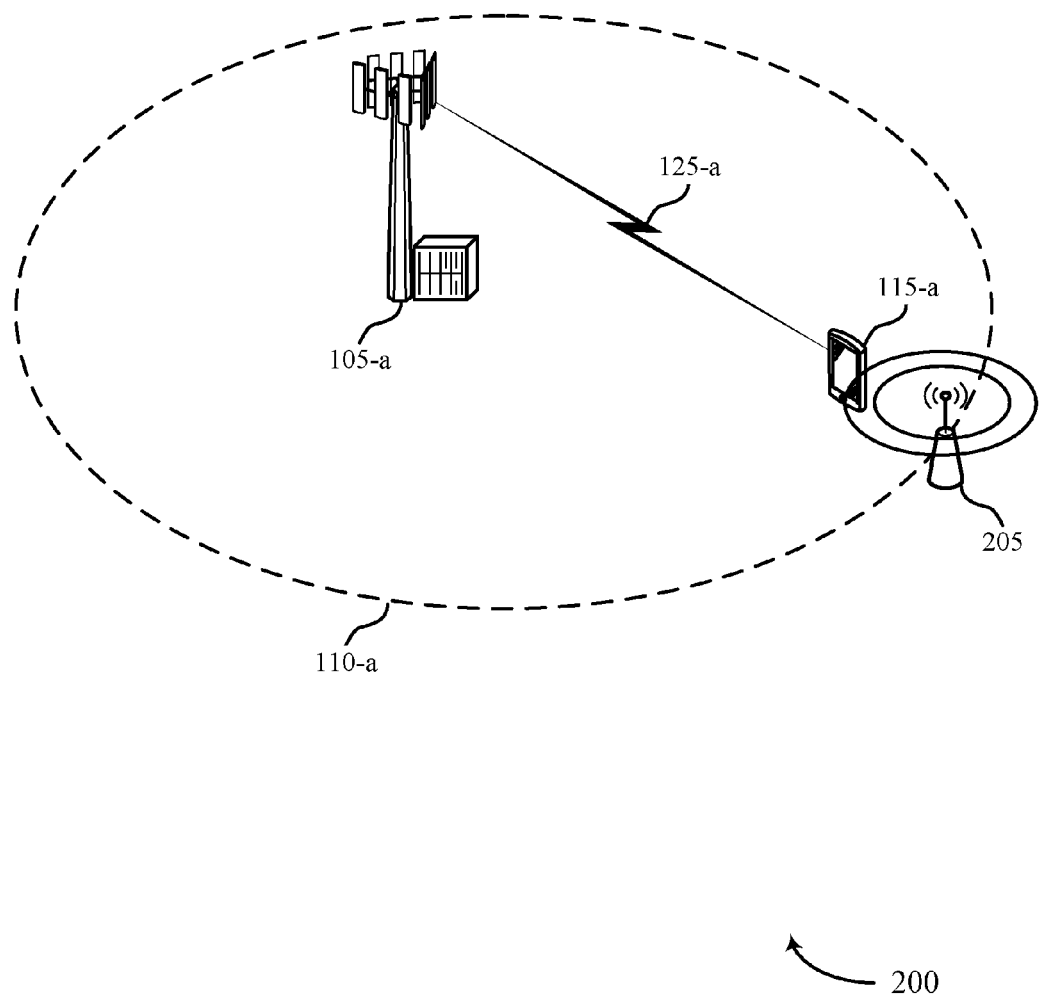
FIG. 2 illustrates an example of a wireless communications subsystem that supports channel clearance techniques using shared radio frequency spectrum band in accordance with various aspects of the present disclosure.

FIG. 2 illustrates an example of a wireless communications subsystem 200 for memory management for reception of wireless communications in accordance with various aspects of the present disclosure. Wireless communications subsystem 200 may include a device 115-a and base station 105-a, which may be examples of a UE 115 base station 105 described with reference to FIG. 1. Base station 105-a may have a coverage area 110-a, and communicate with device 115-a via communications link 125-a. In some examples, communications link 125-a may use a shared channel in a shared radio frequency spectrum band.

In the example of FIG. 2, a Wi-Fi node 205 may be located near UE 115-a, and may interfere with transmissions between the UE 115-a and base station 105-a. For example, Wi-Fi node 205 may not receive a channel clearance signal from the base station 105-a prior to transmission from the base station 105-a to UE 115-a. If Wi-Fi node 105 transmits during the DL portion of the radio frame, UE 115-a may receive interference and not properly receive and decode the transmissions from base station 105-a. Furthermore, the base station 105-a may transmit using a modulation and coding scheme (MCS) that is determined based on interference levels that do not take into account such interference and channel conditions at the UE 115-a. In some examples, as will be described in more detail below, base station 105-a and UE 115-a may perform a dual transaction process that may include a short transmission for pre-grant transmission and acknowledgement, followed by radio frame transmissions, which may allow both base station 105-a and UE 115-a to determine channel conditions prior to transmissions on a channel. While one UE 115-a is illustrated in FIG. 2, many UEs 115 may be in communication with base station 105-a.

Figure 3:
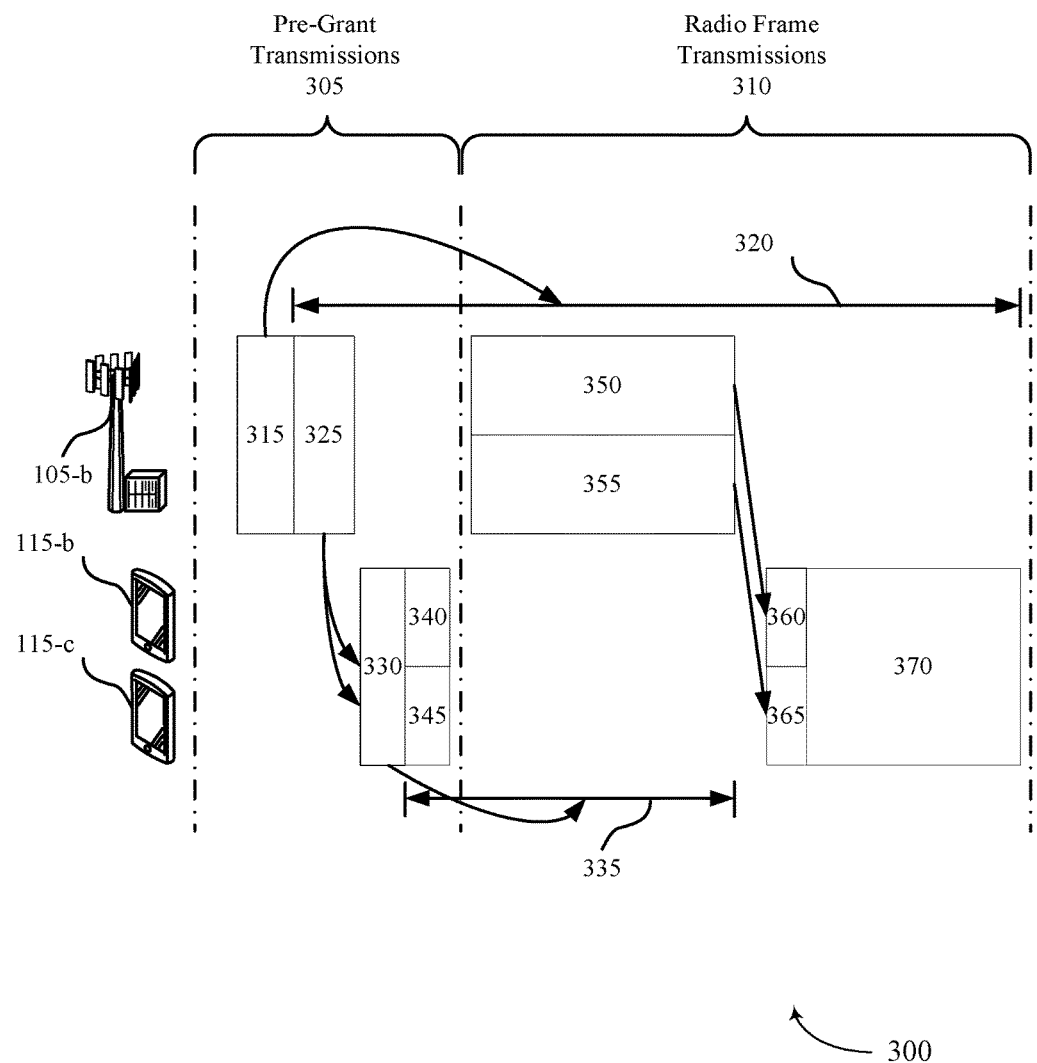
FIG. 3 illustrates an example of a pre-grant transmission and radio frame transmission in accordance with various aspects of the present disclosure.

FIG. 3 illustrates an example of a dual transaction process 300 of pre-grant transmissions 305 and radio frame transmissions 310 in accordance with various aspects of the present disclosure. Example 300 may include a first UE 115-b, a second UE 115-c and base station 105-b, which may be examples of a UE 115 and base station 105 described with reference to FIGS. 1-2. In the example of FIG. 3, the base station 105-b nay perform a LBT procedure, and in the event that the LBT procedure passes the base station 105-b may reserve one or more channels for transmissions through transmission of a Wi-Fi "CTS-to-Self" transmission 315 with length field that covers a time duration 320 sufficient to cover both the pre-grant transmissions 305 and radio frame transmissions 310. The Wi-Fi CTS-to-self transmission 315 may use a Wi-Fi waveform (e.g., an IEEE 802.11 CTS transmission), so Wi-Fi nodes in the neighborhood of base station 105-b (i.e., one or more Wi-Fi nodes within range of the base station 105-b) can detect that base station 105-b is reserving the channel(s), and refrain from transmitting using the channels in order to protect the base station 105-b from interference. Note that, in examples, this Wi-Fi waveform is not intended for UE 115-*b* or UE 115-*c*, but is provided to clear the radio frequency spectrum band in the neighborhood of the base station 105-*b*.

Following the CTS-to-self 315, the base station 105-*b* may transmit a pre-grant transmission 325. The pre-grant transmission 325 may include information on one or more channels to be used for a subsequent downlink transmission and a length of the downlink transmission. For example, the pre-grant transmission 325 may indicate two or more sub-bands of a 20 MHz channel, or which of multiple channels, are to be used for a subsequent DL transmission. For example, CTS-to-self transmission 315 and pre-grant transmission 325 may occupy multiple sub-bands in a 20 MHz channel, but it will be readily understood that the concepts described herein may be generalized to multiple channels. The pre-grant transmission 325 may also indicate particular UEs 115 that are to receive transmissions, and a time duration for the transmissions. Both the first UE 115-*b* and the second UE 115-*c* may receive the pre-grant transmission 325, and determine which 20 MHz channel it will be served on. The UEs 115 may then perform an LBT procedure on those channels to see if they clear (e.g., interfered or not), and send a UE Wi-Fi CTS 330 to clear its neighborhood if the LBT procedure is successful. Similarly as with the base station CTS-to-self transmission 315, the UE Wi-Fi CTS 330 is not intended for reception by the base station 105-*b*. The UE Wi-Fi CTS 330 may cover a period of time 335 based on the scheduled duration of DL transmissions from the base station 105-*b*. Both the first UE 115-*b* and the second UE 115-*b* (and any other UEs) may send UE Wi-Fi CTS 330 over the same 20 MHz channel if they will be served with different resource blocks (RBs) in that channel in DL transmission, and therefore if multiple UEs 115 transmit the UE Wi-Fi CTS 330, the waveforms form a single frequency network (SFN), and will not interfere with each other.

Following the UE Wi-Fi CTS 330, the first UE 115-*b* may transmit a feedback transmission 340 to the base station 105-*b*, and the second UE 115-*c* may transmit a feedback transmission 345 to the base station 105-*b*. Each of the feedback transmissions 340, 345, may include an acknowledgment to the pre-grant transmission 325. In some examples, the feedback transmissions 340, 345 may also indicate which channel passed the LBT procedure, which may be less than all of the channels indicated in the pre-grant transmission 325. The feedback transmissions 340, 345, in certain examples, may also include channel quality indicator (CQI) information, which may indicate one or more channel characteristics and may be used by the base station 105-*b* to determine a more accurate MCS for the DL transmissions. The feedback transmissions 340, 345 may use a different waveform than the UE Wi-Fi CTS 330, such as an orthogonal frequency division multiplexing (OFDM) waveform used in an LTE/LTE-A system. The feedback transmissions 340, 345 may be transmitted using frequency division multiplexing (FDM), such that each UE 115 uses different sub-bands of a channel to transmit to the base station 105-*b*.

The base station 105-*b* may receive the feedback transmissions 340, 345, and use the information from the transmissions to determine one or more channels to use for the downlink transmissions, and may also use the information to determine a MCS for the radio frame transmissions 310. The base station 105-*b* may then transmit first downlink transmissions 350 to the first UE 115-*b*, and second downlink transmissions 355 to the second UE 115-*c*. The downlink transmissions 350, 355 may include physical downlink control channel (PDCCH) transmissions that may carry final DL grants, which can be different grants indicated in the pre-grant transmission 325. For example, if the first UE 115-*b* indicated that only certain channels cleared the LBT procedure, the PDCCH transmission may indicate first DL transmissions 350 are on one or more of the channels that cleared the PBT procedure. Furthermore, the MCS of downlink transmissions 350, 355 may reflect the CQI reported in the feedback transmissions 340, 345. Following the downlink transmissions 350, 355, the first UE 115-*b* and second UE 115-*c* may transmit uplink (UL) transmissions, which may include first physical uplink control channel (PUCCH) transmission 360 from the first UE 115-*b* and second PUCCH transmission 365 from the second UE 115-*c*, and physical uplink shared channel (PUSCH) transmissions 370 from each UE 115.

In some examples, a UE 115 may not have a successful LBT procedure for one of more of the channels indicated in the pre-grant transmission 325. For example, a UE 115 may be under relatively strong interference which may indicate another device is using the channel. In such cases, the UE 115 may not transmit the UE Wi-Fi CTS 330 on the affected channels, although the UE Wi-Fi CTS may still be transmitted on one more channels if the respective channel did pass the LBT procedure. In some examples, the pre-grant transmission 325 and feedback transmissions 340, 345, may use a relatively short transmission time interval (TTI) and thus provide a relatively short pre-grant transmissions period 305 relative to the radio frame transmissions period 310. In some examples, the pre-grant transmission 325 may indicate a DL grant all available channels to each UE 115, and the base station 115-*b* may then determine which particular channel(s) to use based on the feedback transmissions 340, 345. In some examples, a UE Wi-Fi CTS 330 transmission power may be selected to provide an adequate silencing area, or neighborhood, to provide a target signal-to-noise ratio (SNR).

In further examples, an environment sensing algorithm may be used to enable or disable pre-grant transactions. For example, in a relatively static environment, a UE 115 may not see any strong interference for a specified time period, and may determine that the pre-grant transmissions 305 are not needed to clear the channel. In the event that interference is detected, the pre-grant transmissions 305 may be re-enabled.

In still further examples, one or more UEs 115 may determine that performing the LBT procedure is not required. For example, the first UE 115-*b* may determine that the only uplink transmissions are the feedback transmissions 340 and an acknowledgment of first DL transmission 350 and that the duration of these transmissions will not cause significant interference for other devices, or the first UE 115-*b* may be capable of transmitting a CCA exempt transmission (CET), and in such cases may skip performing the LBT procedure. In some examples, one or more UEs 115 also may monitor transmissions and maintain an estimation of interference level in the future. If the interference level is estimated to be relatively high, for example, the first UE 115-*b* may decline the pre-grant transmission 325 by not acknowledging the transmission in a feedback transmission 340. If the first UE 115-*b* estimates the interference will not be too high, it can acknowledge the pre-grant transmission 325, but adjust the reported CQI to reflect the estimated interference level when transmitting feedback transmission 340. Such an estimation of future interference levels may be made, for example, by monitoring the other Wi-Fi preambles from other Wi-Fi nodes or eCC nodes. The Wi-Fi preamble energy may provide the interference level information, and also may contain length information to indicate how long that inference will last. Such information may be aggregated over all preambles detected. The UE 115-*b* can predict the interference level in the near future and use that to assist the acknowledgment decision for the pre-grant transmission 325. In still further examples, if no UE 115 acknowledges the pre-grant transmission 325, the base station 105-*b* may abandon the radio frame and start another new radio frame transmission procedure with a different set of UEs 115.

Figure 4:
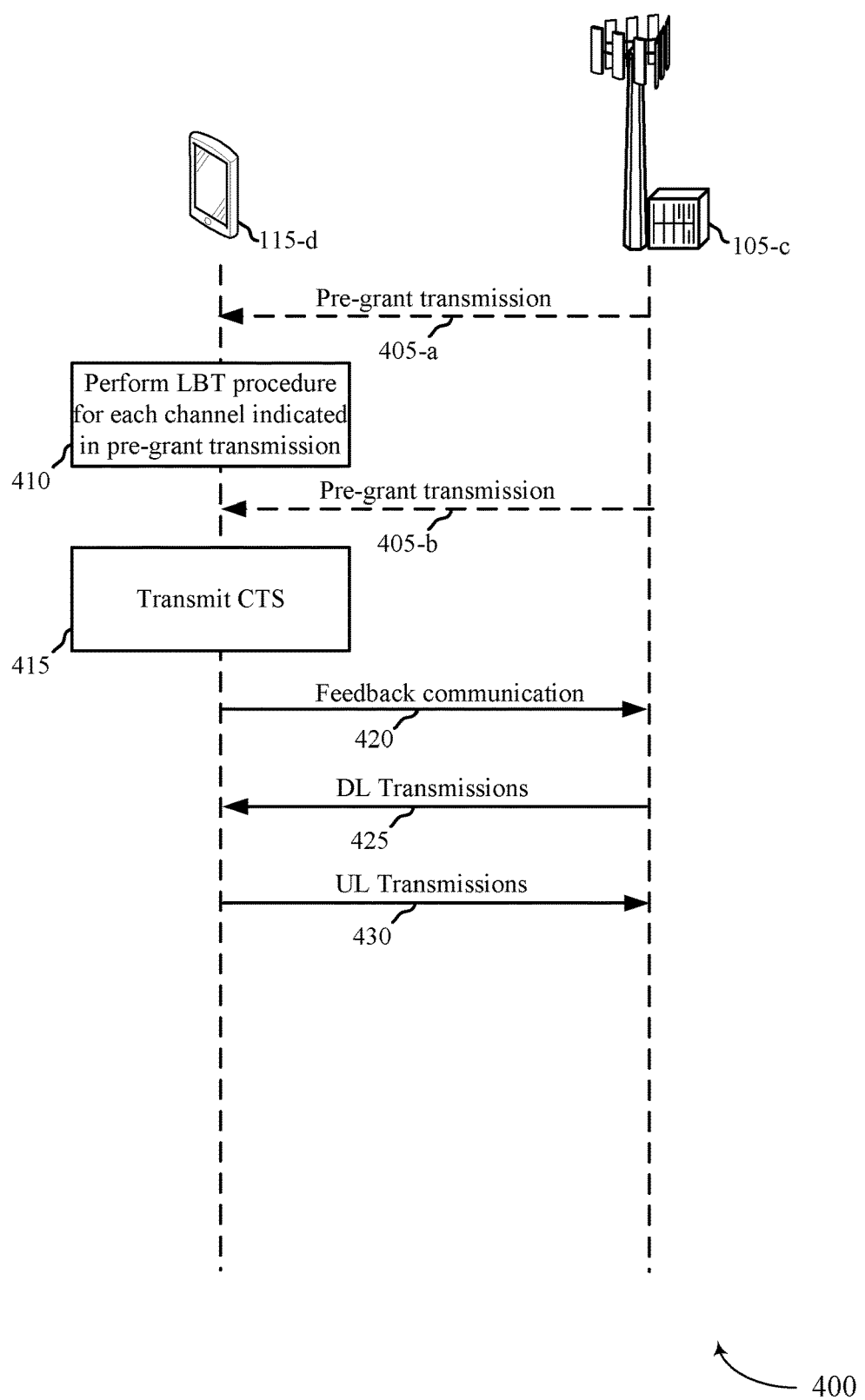
FIG. 4 illustrates an example of a process flow at a UE that supports channel clearance techniques using shared radio frequency spectrum band in accordance with various aspects of the present disclosure.

FIG. 4 illustrates an example of a process flow 400 for channel clearance techniques using shared radio frequency spectrum band in accordance with various aspects of the present disclosure. Process flow 400 may include a UE 115-*d* and base station 105-*c*, which may be examples of a UE 115 and base station 105 described with reference to FIGS. 1-3. The UE 115-*d* may receive pre-grant transmission 405-*a* from the base station 105-*c*. The pre-grant transmission may indicate, for example, one or more channels for a downlink transmission and a length of the downlink transmission. The UE 115-*d* may perform a listen-before-talk (LBT) procedure, based on the pre-grant transmission, for the channels indicated in the pre-grant transmission, as indicated at block 410. Alternatively, the UE 115-*d* may perform an LBT procedure before receiving a pre-grant transmission 405-*b* from the base station 105-*c*. In this instance, the UE 115-*d* may periodically poll one or more channels in a shared radio frequency spectrum band to determine whether the one or more channels are available for transmissions.

The UE 115-*d*, at block 415, may transmit a channel clearance signal based on the listen-before-talk (LBT) procedure. The channel clearance signal may be transmitted using a first waveform type, such as a Wi-Fi waveform type. A transmission power of the channel clearance signal, in some examples, may be selected to clear Wi-Fi transmitters within a neighborhood of the wireless device.

The UE 115-*d* may transmit a feedback communication 420 responsive to the pre-grant transmission 405-*a* or 405-*b*. The feedback communication 420 may indicate, for example, that the pre-grant transmission was received and which of the one or more channels are available based on the LBT procedure. In some examples, the UE 115-*d* may transmit the feedback communication 420 using a second waveform type, which may be different from the first waveform type. In some examples the first waveform type is a Wi-Fi waveform, and the second waveform type is an orthogonal frequency division multiplexing (OFDM) waveform.

The transmission power of the feedback communication 420, in certain examples, may be selected to transmit the feedback communication to the base station 105-*c* that generated the pre-grant transmission 420. In some examples the transmission power of the channel clearance signal is selected based at least in part on one or more of an area of the neighborhood of the wireless device or a channel quality requirement of the downlink transmission.

The UE 115-*d* then may receive downlink transmission(s) 425 and transmit uplink transmission(s) 430. In some examples the pre-grant transmission 405 indicates two or more channels, and the downlink transmission(s) 425 is received on fewer than all of the channels indicated in the pre-grant transmission 405. In some examples the downlink transmission(s) 425 may include a downlink grant indicating a channel assignment and downlink data. In some examples the feedback communication 420 may include CQI information, which may be used by base station 105-*c* in the selection of a MCS for communications with the UE 115-*d*.

The UE 115-*d*, in certain examples, may skip transmission of the channel clearance signal 415 and the feedback communication 420 when the LBT procedure indicates the one or more channels may be occupied. In other examples, UE 115-*d* may determine the absence of interference for one or more channels for a defined time period and may transmit an indication to discontinue the pre-grant transmissions. In further examples, the UE 115-*d* may determine that the feedback communication 420 may be a clear channel exempt transmission (CET) and may skip the LBT procedure.

In further examples, the UE 115-*d* may monitor channel clearance signals of other nodes, and their power levels, for one or more channels, and may estimate a future interference level using a duration indicated in the detected channel clearance signals and their power levels. The feedback communication 420, in such examples, may further be responsive to the estimating the future interference level. In some examples the monitoring may include monitoring Wi-Fi preambles of other nodes, and the estimate of future interference level may be based on aggregating interference levels and length information associated with the Wi-Fi preambles.

Figure 5:
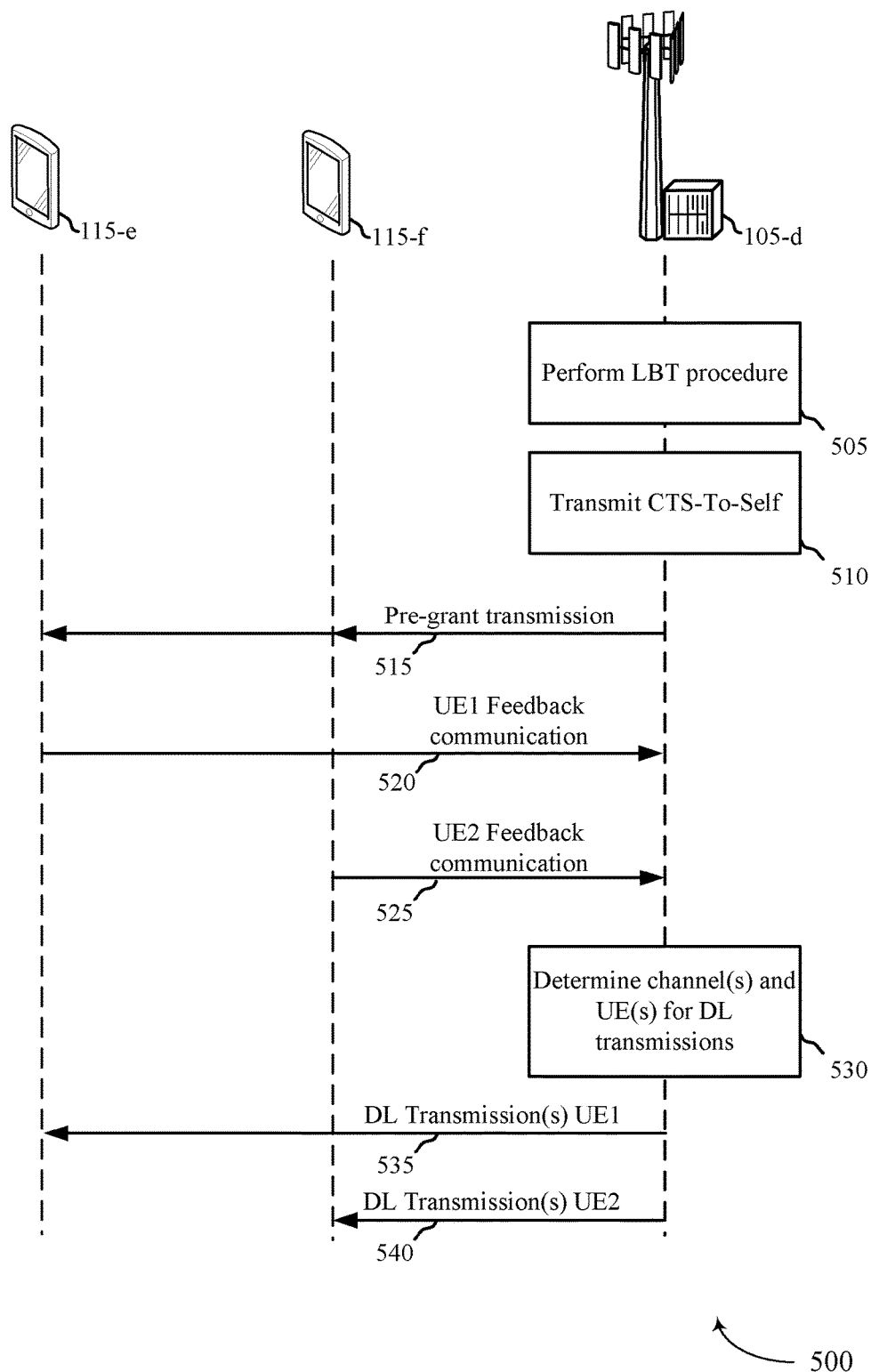
FIG. 5 illustrates an example of a process flow at a base station that supports channel clearance techniques using shared radio frequency spectrum band in accordance with various aspects of the present disclosure.

FIG. 5 illustrates an example of a process flow 500 for channel clearance techniques using shared radio frequency spectrum band in accordance with various aspects of the present disclosure. Process flow 500 may include a first UE 115-*e*, a second UE 115-*f*, and base station 105-*d*, which may be examples of a UE 115 and base station 105 described with reference to FIGS. 1-3.

The base station 105-*d*, at block 505, may perform an LBT procedure for one or more channels of a shared radio frequency spectrum band. If the LBT procedure indicates that one or more of the channels are available for transmission, the base station 105-*d* may, at block 510, transmit a channel clearance signal, such as a CTS-to-self signal, having a length indication based on a pre-grant transmission/acknowledgment length and a radio frame transmission length. The base station 105-*d* may transmit the pre-grant transmission 515 to the first UE 115-*e* and the second UE 115-*f*. The pre-grant transmission 515 may indicate one or more channels for a downlink transmission and a length of the downlink transmission.

The base station 105-*d* may receive UE1 feedback communication 520 from the first UE 115-*e*, and UE2 feedback communication 525 from the second UE 115-*f*. The feedback communications 520, 525 may indicate that the pre-grant transmission 515 was received and which of the one or more channels are available for the downlink transmission. In some examples, the feedback communications 520, 525 may include CQI information that may be used in selecting a MCS for communications. At block 530, the base station 105-*d* may determine the channel(s) and UE(s) for downlink transmissions. The base station 105-*d* may transmit DL transmissions 535 to UE1 115-*e* and may transmit DL transmissions 540 to UE2 115-*f*.

In some examples the CTS-to-self from block 510 has a first waveform type and the pre-grant transmission 515 has a second waveform type that is different than the first waveform type. In some examples the first waveform type is a Wi-Fi waveform, and the second waveform type is an orthogonal frequency division multiplexing (OFDM) waveform. In some examples the pre-grant transmission 515 indicates two or more channels for the downlink transmission, and one or more channels of the two or more channels may be selected for transmitting the downlink transmissions 535-540 based at least in part on the feedback communication 520-525. In some examples the downlink transmissions 535-540 are transmitted on fewer than all of the channels indicated in the pre-grant transmission 515. In some examples the feedback communication 520-525 may be received from a number of UEs 115, and the downlink transmissions 535-540 may be transmitted to fewer than all of the UEs 115.

The base station 105-d, as mentioned above, may determine a MCS for the downlink communication based on a CQI. In some examples, the base station 105-d may identify an absence of interference for one or more channels, and may discontinue the pre-grant transmissions. In some examples the identifying the absence of interference may be based at least in part on an indication of little or no interference at a UE for a defined period of time. In some examples, the feedback communications 520-525 may indicate that one or more of the UEs 115 may not be able to transmit on one or more channels, and the base station 105-d may initiate a new pre-grant transmission directed to one or more different UEs 115.

Figure 6:
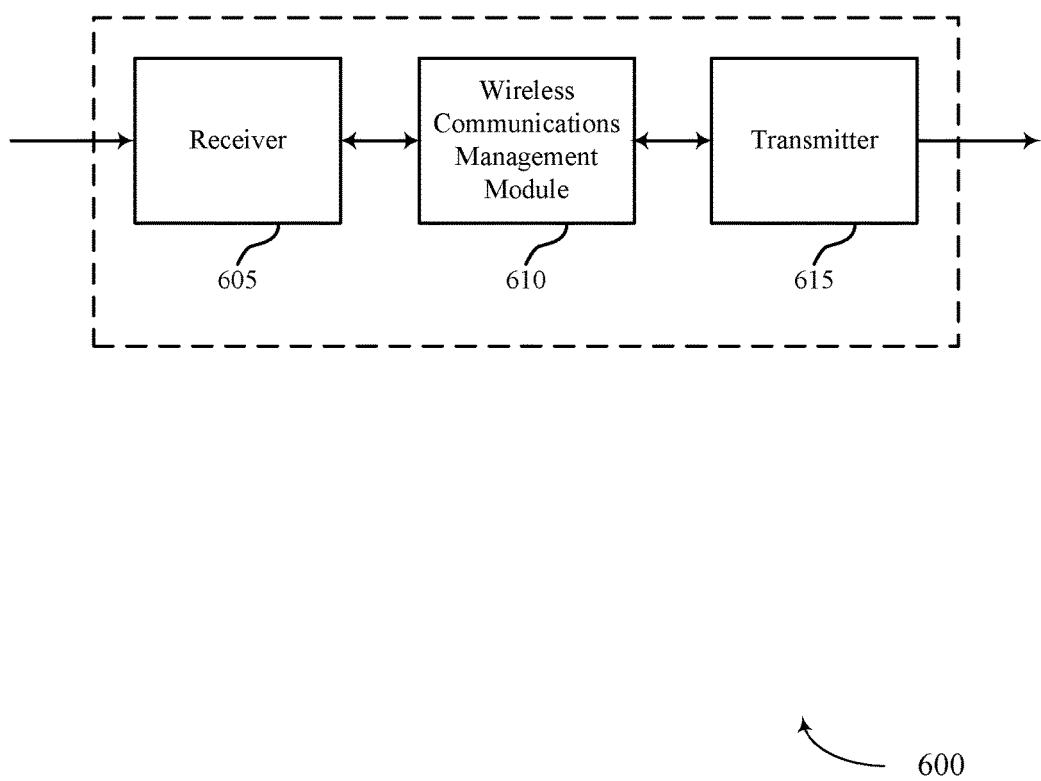
FIGS. 6-8 show block diagrams of a wireless device that supports channel clearance techniques using shared radio frequency spectrum band in accordance with various aspects of the present disclosure.

FIG. 6 shows a block diagram of a wireless device 600 configured for channel clearance techniques using shared radio frequency spectrum band in accordance with various aspects of the present disclosure. Wireless device 600 may be an example of aspects of a UE 115 described with reference to FIGS. 1-5. Wireless device 600 may include a receiver 605, a wireless communications management module 610, or a transmitter 615. Wireless device 600 may also include a processor. Each of these components may be in communication with each other.

The receiver 605 may receive information such as packets, user data, or control information associated with various information channels (e.g., control channels, data channels, and information related to channel clearance techniques using shared radio frequency spectrum band, etc.). Information may be passed on to the wireless communications management module 610, and to other components of wireless device 600.

The wireless communications management module 610 may receive, by a wireless device, a pre-grant transmission indicating one or more channels for a downlink transmission and a length of the downlink transmission, perform a listen-before-talk (LBT) procedure, based at least in part on the pre-grant transmission, for the channels indicated in the pre-grant transmission, transmit a channel clearance signal based at least in part on the LBT procedure, and transmit a feedback communication responsive to the pre-grant transmission, the feedback communication indicating the pre-grant transmission was received and which of the one or more channels are available based at least in part on the LBT procedure.

The transmitter 615 may transmit signals received from other components of wireless device 600. In some examples, the transmitter 615 may be collocated with the receiver 605 in a transceiver module. The transmitter 615 may include a single antenna, or it may include a plurality of antennas.

Figure 7:
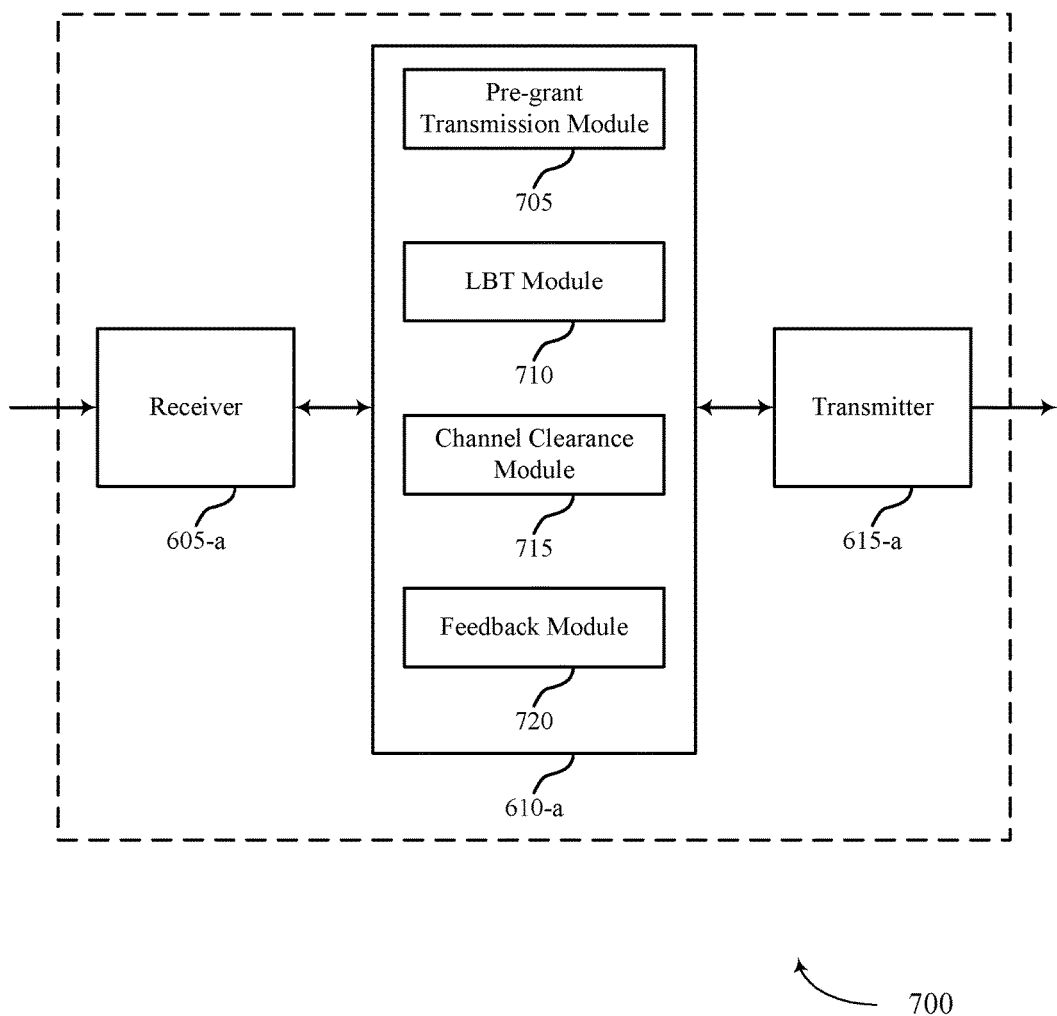

FIG. 7 shows a block diagram of a wireless device 700 for channel clearance techniques using shared radio frequency spectrum band in accordance with various aspects of the present disclosure. Wireless device 700 may be an example of aspects of a wireless device 600 or a UE 115 described with reference to FIGS. 1-6. Wireless device 700 may include a receiver 605-a, a wireless communications management module 610-a, or a transmitter 615-a. Wireless device 700 may also include a processor. Each of these components may be in communication with each other. The wireless communications management module 610-a may also include a pre-grant transmission module 705, a LBT module 710, a channel clearance module 715, and a feedback module 720.

The receiver 605-a may receive information which may be passed on to wireless communications management module 610-a, and to other components of wireless device 700. The wireless communications management module 610-a may perform the operations described with reference to FIG. 6. The transmitter 615-a may transmit signals received from other components of wireless device 700.

The pre-grant transmission module 705 may receive, for example, a pre-grant transmission indicating one or more channels for a downlink transmission and a length of the downlink transmission as described with reference to FIGS. 2-5. The pre-grant transmission module 705 may also transmit a signal to discontinue the pre-grant transmissions in the event that it is determined that interference has not been present for a defined time period (e.g., no interference for the past 60 seconds).

The LBT module 710 may perform a listen-before-talk (LBT) procedure. In some examples, the LBT procedure is performed after receiving the pre-grant transmission received by the pre-grant transmission module 705, and may be based at least in part on the one or more channels indicated in the pre-grant transmission. In some examples, the LBT procedure is performed before receiving the pre-grant transmission. In this instance, the LBT module 710 may periodically poll one or more channels in a shared radio frequency spectrum band to determine whether the one or more channels are available for transmissions. The LBT procedure may be performed as described with reference to FIGS. 2-5. The LBT module 710 may also skip a transmission of the channel clearance signal and the feedback communication when the LBT procedure indicates the one or more channels are occupied. The LBT module 710 may also determine that the feedback communication is a clear channel exempt transmission (CET), and skip the LBT procedure.

The channel clearance module 715 may transmit a channel clearance signal based at least in part on the LBT procedure as described with reference to FIGS. 2-5. The channel clearance module 715 may also transmit the channel clearance signal using a first waveform type. In some examples, the first waveform type may be a Wi-Fi waveform, and the second waveform type may be an orthogonal frequency division multiplexing (OFDM) waveform. The channel clearance module 715 may also select a transmission power of the channel clearance signal to clear Wi-Fi transmitters within a neighborhood of the wireless device. In some examples, the transmission power of the channel clearance signal may be selected based at least in part on one or more of an area of the neighborhood of the wireless device or a channel quality requirement of the downlink transmission. The channel clearance module 715 may also monitor channel clearance signals of other nodes and their power levels for one or more channels. The channel clearance module 715 may also estimate a future interference level using a duration indicated in the detected channel clearance signals and their power levels. In some examples, the monitoring may include monitoring Wi-Fi preambles, and the estimating may include aggregating interference levels and length information associated with the Wi-Fi preambles. In some examples, as discussed above, the channel clearance signal has a first waveform type and the pre-grant transmission has a second waveform type that may be different than the first waveform type. In some examples, the first waveform type may be a Wi-Fi waveform, and the second waveform type may be an orthogonal frequency division multiplexing (OFDM) waveform.

The feedback module 720 may transmit a feedback communication responsive to the pre-grant transmission, the feedback communication indicating the pre-grant transmission was received and which of the one or more channels are available based at least in part on the LBT procedure as described with reference to FIGS. 2-5. The feedback module 720 may also transmit the feedback communication using a second waveform type, the second waveform type is different from the first waveform type. The feedback module 720 may also select a transmission power of the feedback communication to transmit the feedback communication to a base station that generated the pre-grant transmission. The feedback module 720 may also transmit an indication to discontinue the pre-grant transmissions. In some examples, the transmitting the feedback communication may be further responsive to the estimating the future interference level.

Figure 8:
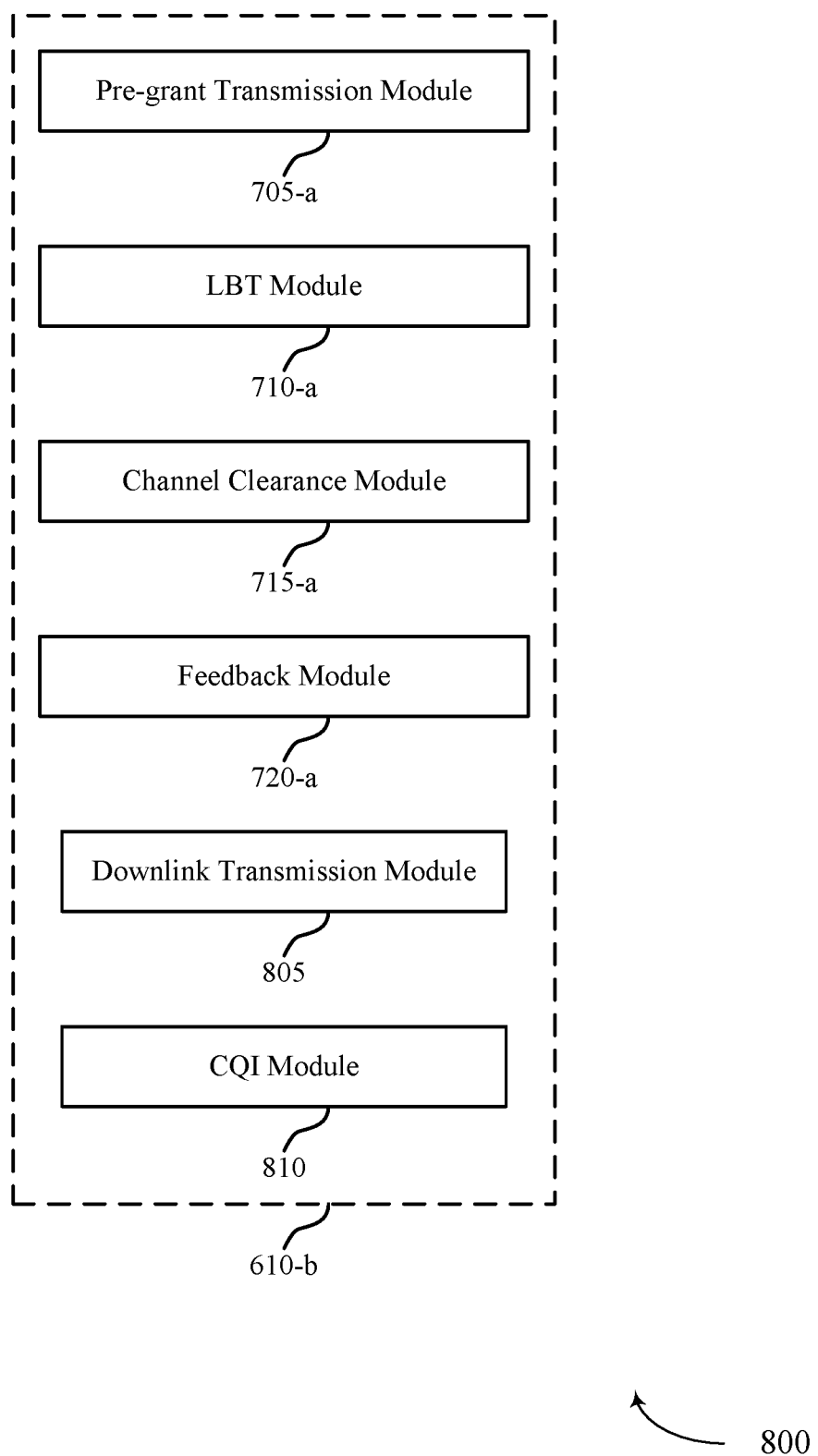

FIG. 8 shows a block diagram 800 of a wireless communications management module 610-*b* which may be a component of a wireless device 600 or a wireless device 700 for channel clearance techniques using shared radio frequency spectrum band in accordance with various aspects of the present disclosure. The wireless communications management module 610-*b* may be an example of aspects of a wireless communications management module 610 described with reference to FIGS. 6-7. The wireless communications management module 610-*b* may include a pre-grant transmission module 705-*a*, a LBT module 710-*a*, a channel clearance module 715-*a*, and a feedback module 720-*a*. Each of these modules may perform the functions described with reference to FIG. 7. The wireless communications management module 610-*b* may also include a downlink transmission module 805, and a CQI module 810.

The downlink transmission module 805 may receive the downlink transmission as described with reference to FIGS. 2-5. In some examples, the pre-grant transmission indicates two or more channels, and the downlink transmission may be received on fewer than all of the channels indicated in the pre-grant transmission. In some examples, the downlink transmission may be transmitted on fewer than all of the channels indicated in the pre-grant transmission.

The CQI module 810 may be configured such that the feedback communication further may include channel quality information (CQI) as described with reference to FIGS. 2-5. The CQI module 810 may also determine the absence of interference for one or more channels for a defined time period.

Figure 9:
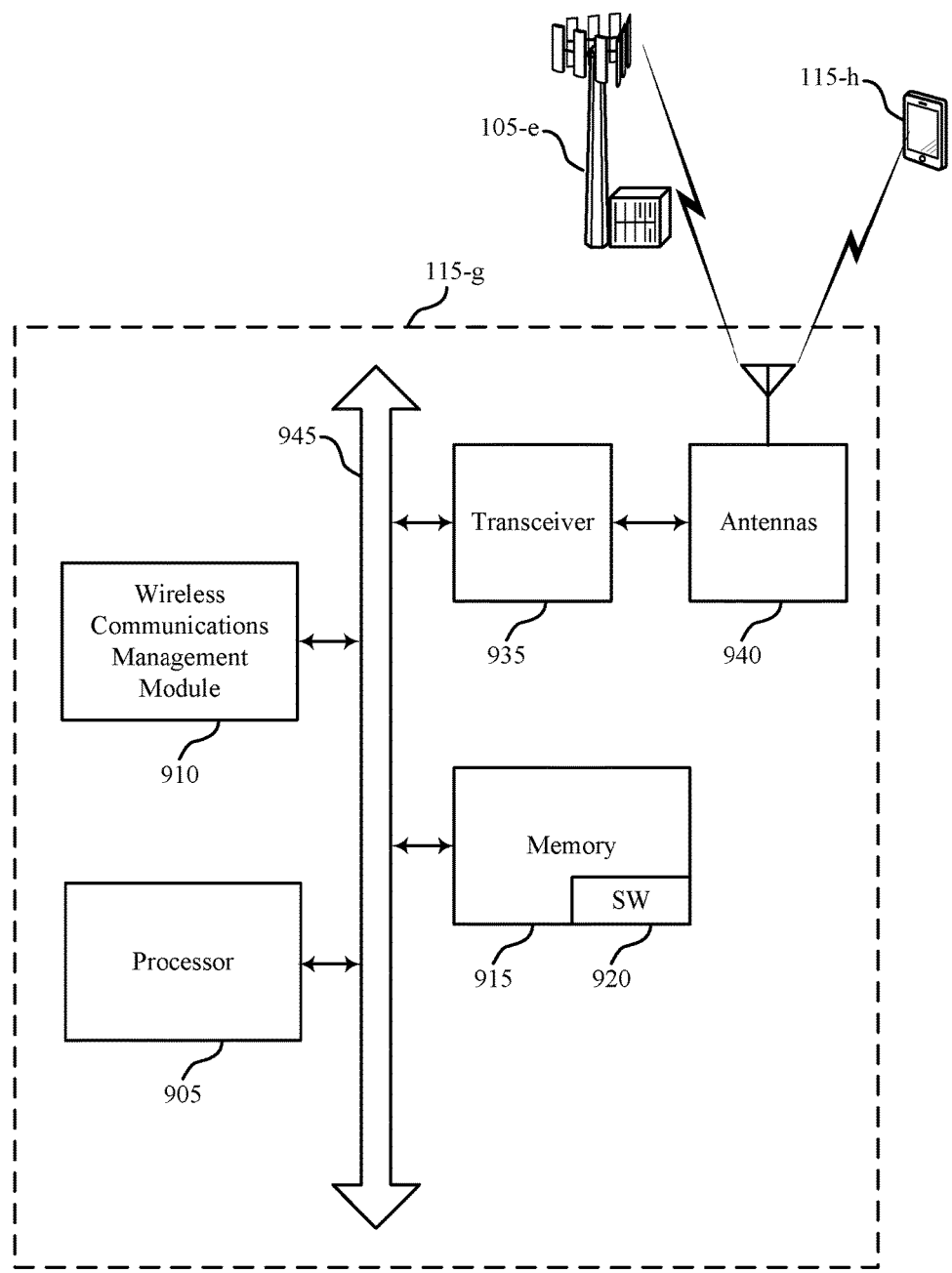
FIG. 9 illustrates a block diagram of a system including a user equipment (UE) that supports channel clearance techniques using shared radio frequency spectrum band in accordance with various aspects of the present disclosure.

FIG. 9 shows a diagram of a system 900 including a UE 115 configured for channel clearance techniques using shared radio frequency spectrum band in accordance with various aspects of the present disclosure. System 900 may include UE 115-*g*, which may be an example of a wireless device 600, a wireless device 700, or a UE 115 described with reference to FIGS. 1-8. UE 115-*g* may include a wireless communications management module 910, which may be an example of a wireless communications management module 610 described with reference to FIGS. 6-8. UE 115-*g* may also include components for bi-directional voice and data communications including components for transmitting communications and components for receiving communications. For example, UE 115-*g* may communicate bi-directionally with UE 115-*h* or base station 105-*e*.

UE 115-*g* may also include a processor 905, and memory 915 (including software (SW) 920), a transceiver 935, and one or more antenna(s) 940, each of which may communicate, directly or indirectly, with one another (e.g., via buses 945). The transceiver 935 may communicate bi-directionally, via the antenna(s) 940 or wired or wireless links, with one or more networks (e.g., a Wi-Fi network, an LTE/LTE-A network, or both), as described above. For example, the transceiver 935 may communicate bi-directionally with a base station 105-*e*, another UE 115-*h*, or a Wi-Fi access point (not shown). The transceiver 935 may include a modem to modulate the packets and provide the modulated packets to the antenna(s) 940 for transmission, and to demodulate packets received from the antenna(s) 940. While UE 115-*g* may include a single antenna 940, UE 115-*g* may also have multiple antennas 940 capable of concurrently transmitting or receiving multiple wireless transmissions.

The memory 915 may include random access memory (RAM) and read only memory (ROM). The memory 915 may store computer-readable, computer-executable software/firmware code 920 including instructions that, when executed, cause the processor 905 to perform various functions described herein (e.g., channel clearance techniques using shared radio frequency spectrum band, etc.). Alternatively, the software/firmware code 920 may not be directly executable by the processor 905 but cause a computer (e.g., when compiled and executed) to perform functions described herein. The processor 905 may include an intelligent hardware device, (e.g., a central processing unit (CPU), a microcontroller, an application specific integrated circuit (ASIC), etc.)

Figure 10:
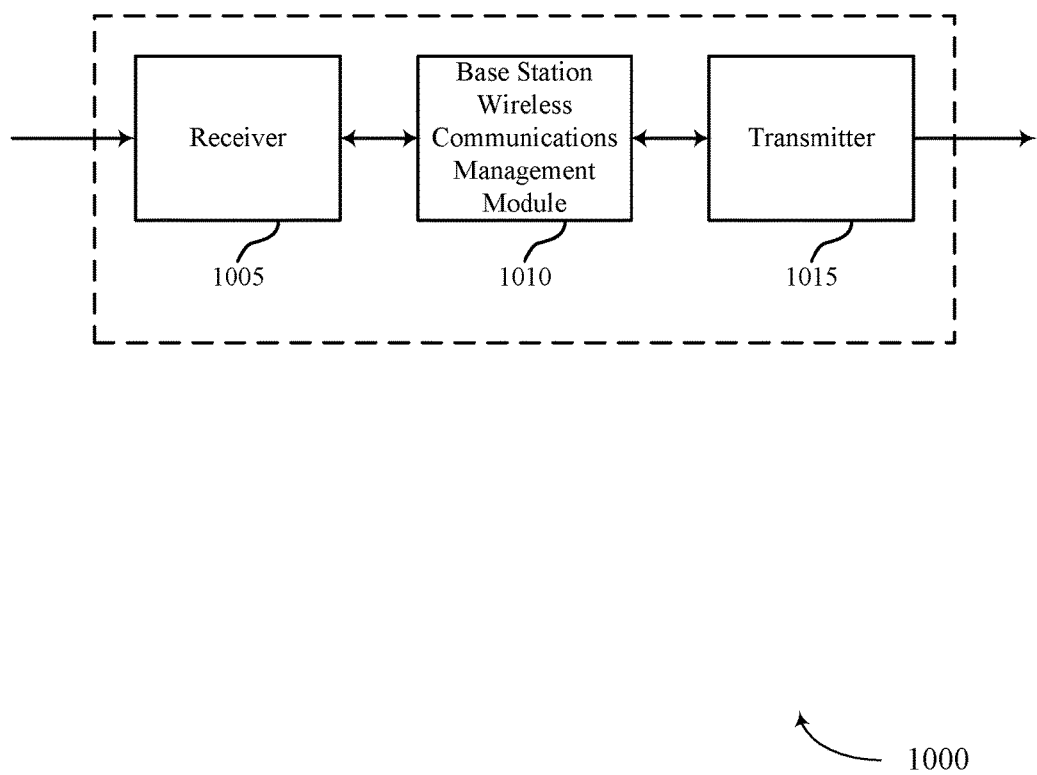
FIGS. 10-12 show block diagrams of a wireless device that supports channel clearance techniques using shared radio frequency spectrum band in accordance with various aspects of the present disclosure.

FIG. 10 shows a block diagram of a wireless device 1000 configured for channel clearance techniques using shared radio frequency spectrum band in accordance with various aspects of the present disclosure. Wireless device 1000 may be an example of aspects of a base station 105 described with reference to FIGS. 1-9. Wireless device 1000 may include a receiver 1005, a base station wireless communications management module 1010, or a transmitter 1015. Wireless device 1000 may also include a processor. Each of these components may be in communication with each other.

The receiver 1005 may receive information such as packets, user data, or control information associated with various information channels (e.g., control channels, data channels, and information related to channel clearance techniques using shared radio frequency spectrum band, etc.). Information may be passed on to the base station wireless communications management module 1010, and to other components of wireless device 1000.

The base station wireless communications management module 1010 may, in conjunction with receiver 1005 or transmitter 1015, transmit a channel clearance signal having a length indication based at least in part on a pre-grant transmission and acknowledgment length and a radio frame transmission length, transmit the pre-grant transmission indicating one or more channels for a downlink transmission and a length of the downlink transmission, and receive a feedback communication responsive to the pre-grant transmission, the feedback communication indicating the pre-grant transmission was received and which of the one or more channels are available for the downlink transmission.

The transmitter 1015 may transmit signals received from other components of wireless device 1000. In some examples, the transmitter 1015 may be collocated with the receiver 1005 in a transceiver module. The transmitter 1015 may include a single antenna, or it may include a plurality of antennas.

Figure 11:
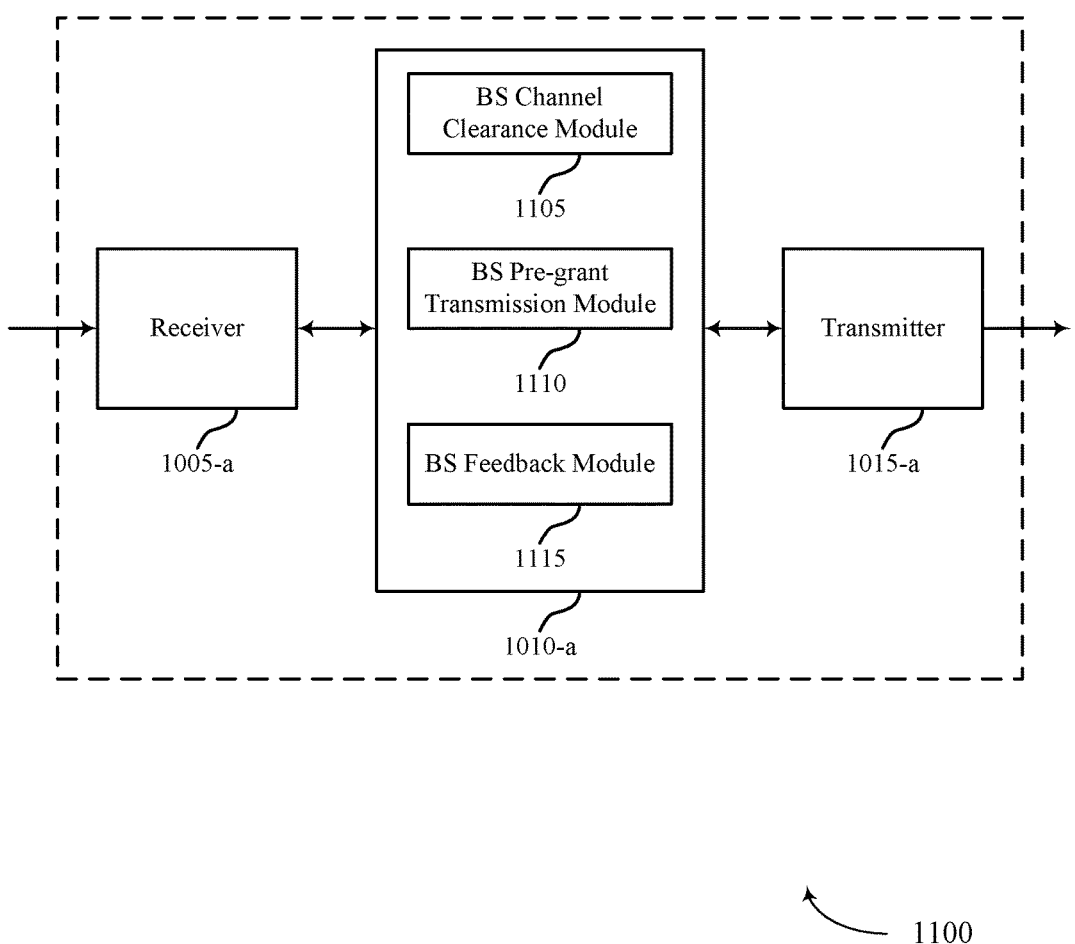

FIG. 11 shows a block diagram of a wireless device 1100 for channel clearance techniques using shared radio frequency spectrum band in accordance with various aspects of the present disclosure. Wireless device 1100 may be an example of aspects of a wireless device 1000 or a base station 105 described with reference to FIGS. 1-10. Wireless device 1100 may include a receiver 1005-*a*, a base station wireless communications management module 1010-*a*, or a transmitter 1015-*a*. Wireless device 1100 may also include a processor. Each of these components may be in communication with each other. The base station wireless communications management module 1010-*a* may also include a BS channel clearance module 1105, a BS pre-grant transmission module 1110, and a BS feedback module 1115.

The receiver 1005-*a* may receive information which may be passed on to base station wireless communications management module 1010-*a*, and to other components of wireless device 1100. The base station wireless communications management module 1010-*a* may perform the operations described with reference to FIG. 10. The transmitter 1015-*a* may transmit signals received from other components of wireless device 1100.

The BS channel clearance module 1105 may cause transmitter 1015-*a* to transmit a channel clearance signal having a length indication based at least in part on a pre-grant transmission and acknowledgment length and a radio frame transmission length as described with reference to FIGS. 2-5. The BS pre-grant transmission module 1110 may cause transmitter 1015-*a* to transmit the pre-grant transmission indicating one or more channels for a downlink transmission and a length of the downlink transmission as described with reference to FIGS. 2-5.

The BS feedback module 1115 may, via receiver 1005-*a*, receive a feedback communication responsive to the pre-grant transmission, the feedback communication indicating the pre-grant transmission was received and which of the one or more channels are available for the downlink transmission as described with reference to FIGS. 2-5.

Figure 12:
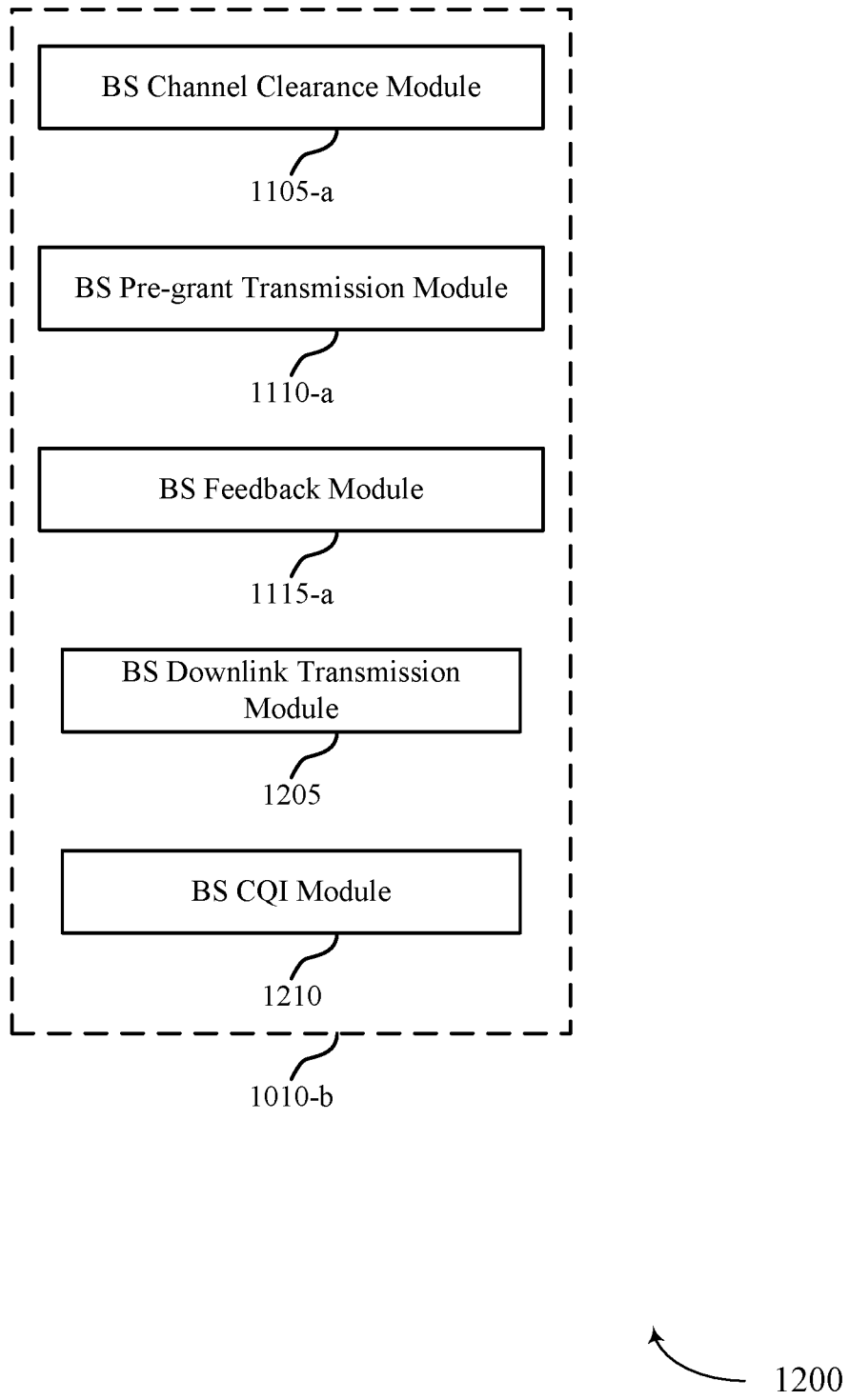

FIG. 12 shows a block diagram 1200 of a base station wireless communications management module 1010-*b* which may be a component of a wireless device 1000 or a wireless device 1100 for channel clearance techniques using shared radio frequency spectrum band in accordance with various aspects of the present disclosure. The base station wireless communications management module 1010-*b* may be an example of aspects of a base station wireless communications management module 1010 described with reference to FIGS. 10-11. The base station wireless communications management module 1010-*b* may include a BS channel clearance module 1105-*a*, a BS pre-grant transmission module 1110-*a*, and a BS feedback module 1115-*a*. Each of these modules may perform the functions described with reference to FIG. 11. The base station wireless communications management module 1010-*b* may also include a BS downlink transmission module 1205, and a BS CQI module 1210.

The BS downlink transmission module 1205 may be configured to, when the pre-grant transmission indicates two or more channels for the downlink transmission, determine one or more channels of the two or more channels for transmitting the downlink transmission based at least in part on the feedback communication as described with reference to FIGS. 2-5. The BS CQI module 1210 may be configured to receive CQI in the feedback communications, and determine an MCS for communications based on the CQI, as described with reference to FIGS. 2-5.

Figure 13:
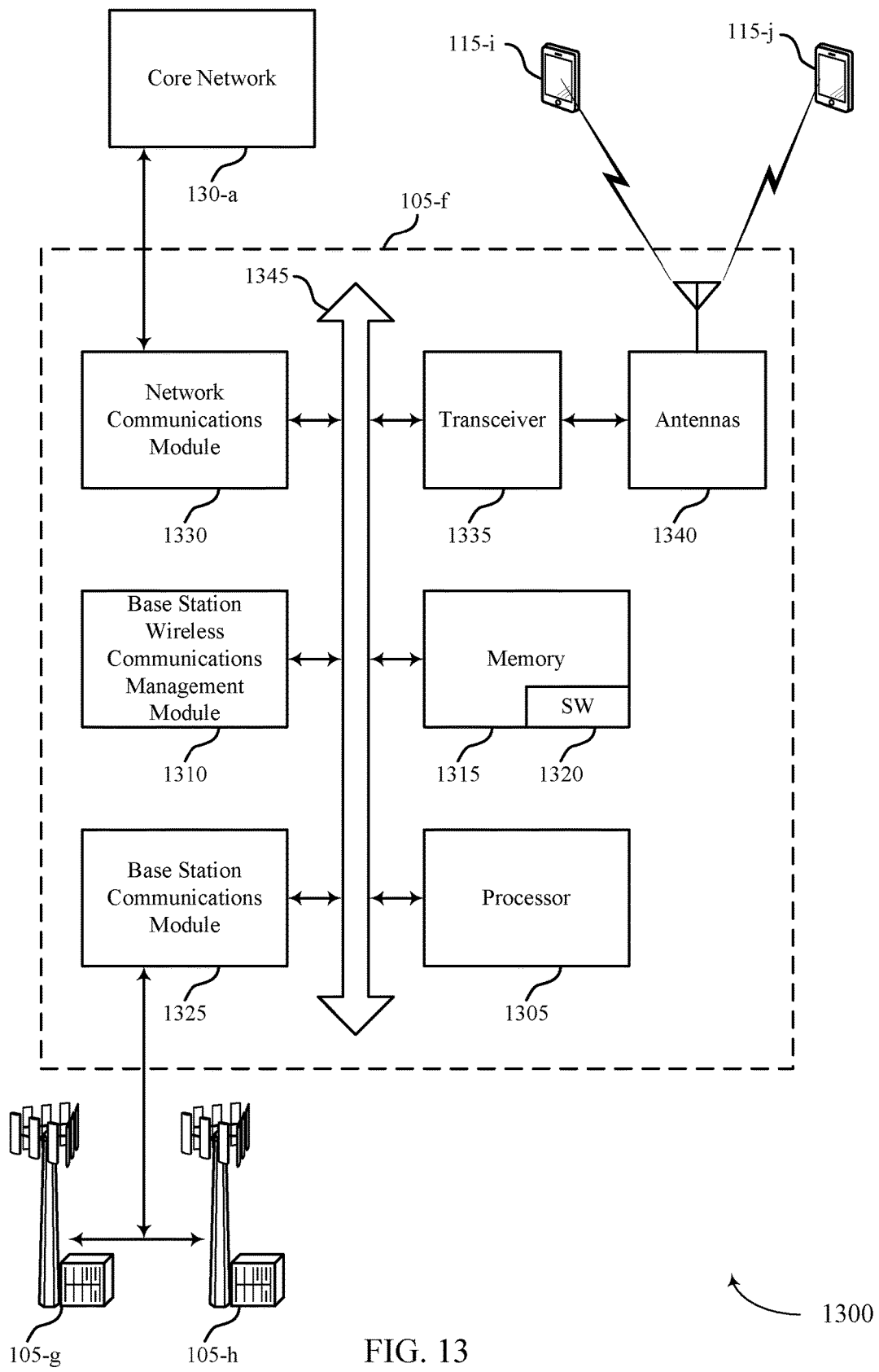
FIG. 13 illustrates a block diagram of a system including a base station that supports channel clearance techniques using shared radio frequency spectrum band in accordance with various aspects of the present disclosure.

FIG. 13 shows a diagram of a system 1300 including a base station 105 configured for channel clearance techniques using shared radio frequency spectrum band in accordance with various aspects of the present disclosure. System 1300 may include base station 105-*f*, which may be an example of a wireless device 1000, a wireless device 1100, or a base station 105 described with reference to FIGS. 1-12. Base Station 105-*f* may include a base station wireless communications management module 1310, which may be an example of a base station wireless communications management module 1010 described with reference to FIGS. 10-12. Base Station 105-*f* may also include components for bi-directional voice and data communications including components for transmitting communications and components for receiving communications. For example, base station 105-*f* may communicate bi-directionally with UE 115-*i* or UE 115-*j*.

In some cases, base station 105-*f* may have one or more wired backhaul links. Base station 105-*f* may have a wired backhaul link (e.g., S1 interface, etc.) to the core network 130. Base station 105-*f* may also communicate with other base stations 105, such as base station 105-*g* and base station 105-*h* via inter-base station backhaul links (e.g., an X2 interface). Each of the base stations 105 may communicate with UEs 115 using the same or different wireless communications technologies. In some cases, base station 105-*f* may communicate with other base stations such as 105-*g* or 105-*h* utilizing base station communication module 1325. In some examples, base station communication module 1325 may provide an X2 interface within a Long Term Evolution (LTE)/LTE-A wireless communication network technology to provide communication between some of the base stations 105. In some examples, base station 105-*f* may communicate with other base stations through core network 130. In some cases, base station 105-*f* may communicate with the core network 130 through network communications module 1330.

The base station 105-*f* may include a processor 1305, memory 1315 (including software (SW) 1320), transceiver 1335, and antenna(s) 1340, which each may be in communication, directly or indirectly, with one another (e.g., over bus system 1345). The transceivers 1335 may be configured to communicate bi-directionally, via the antenna(s) 1340 (using licensed radio frequency spectrum band(s), shared radio frequency spectrum bans(s), or combinations thereof), with the UEs 115, which may be multi-mode devices. The transceiver 1335 (or other components of the base station 105-*f*) may also be configured to communicate bi-directionally, via the antennas 1340, with one or more other base stations (not shown). The transceiver 1335 may include a modem configured to modulate the packets and provide the modulated packets to the antennas 1340 for transmission, and to demodulate packets received from the antennas 1340. The base station 105-*f* may include multiple transceivers 1335, each with one or more associated antennas 1340. The transceiver may be an example of a combined receiver 1005 and transmitter 1015 of FIG. 10.

The memory 1315 may include RAM and ROM. The memory 1315 may also store computer-readable, computer-executable software code 1320 containing instructions that are configured to, when executed, cause the processor 1310 to perform various functions described herein (e.g., channel clearance techniques using shared radio frequency spectrum band, call processing, database management, message routing, etc.). Alternatively, the software 1320 may not be directly executable by the processor 1305 but be configured to cause the computer, e.g., when compiled and executed, to perform functions described herein. The processor 1305 may include an intelligent hardware device, e.g., a CPU, a microcontroller, an ASIC, etc. The processor 1305 may include various special purpose processors such as encoders, queue processing modules, base band processors, radio head controllers, digital signal processor (DSPs), and the like.

The base station communications module 1325 may manage communications with other base stations 105. In some cases, a communications management module may include a controller or scheduler for controlling communications with UEs 115 in cooperation with other base stations 105. For example, the base station communications module 1325 may coordinate scheduling for transmissions to UEs 115 for various interference mitigation techniques such as beamforming or joint transmission.

The components of wireless device 600, wireless device 700, wireless communications management module 610 or wireless communications management module 910, wireless device 1000, wireless device 1100 and base station wireless communications management module 1310 may, individually or collectively, be implemented with at least one ASIC adapted to perform some or all of the applicable functions in hardware. Alternatively, the functions may be performed by one or more other processing units (or cores), on at least one IC. In other examples, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

Figure 14:
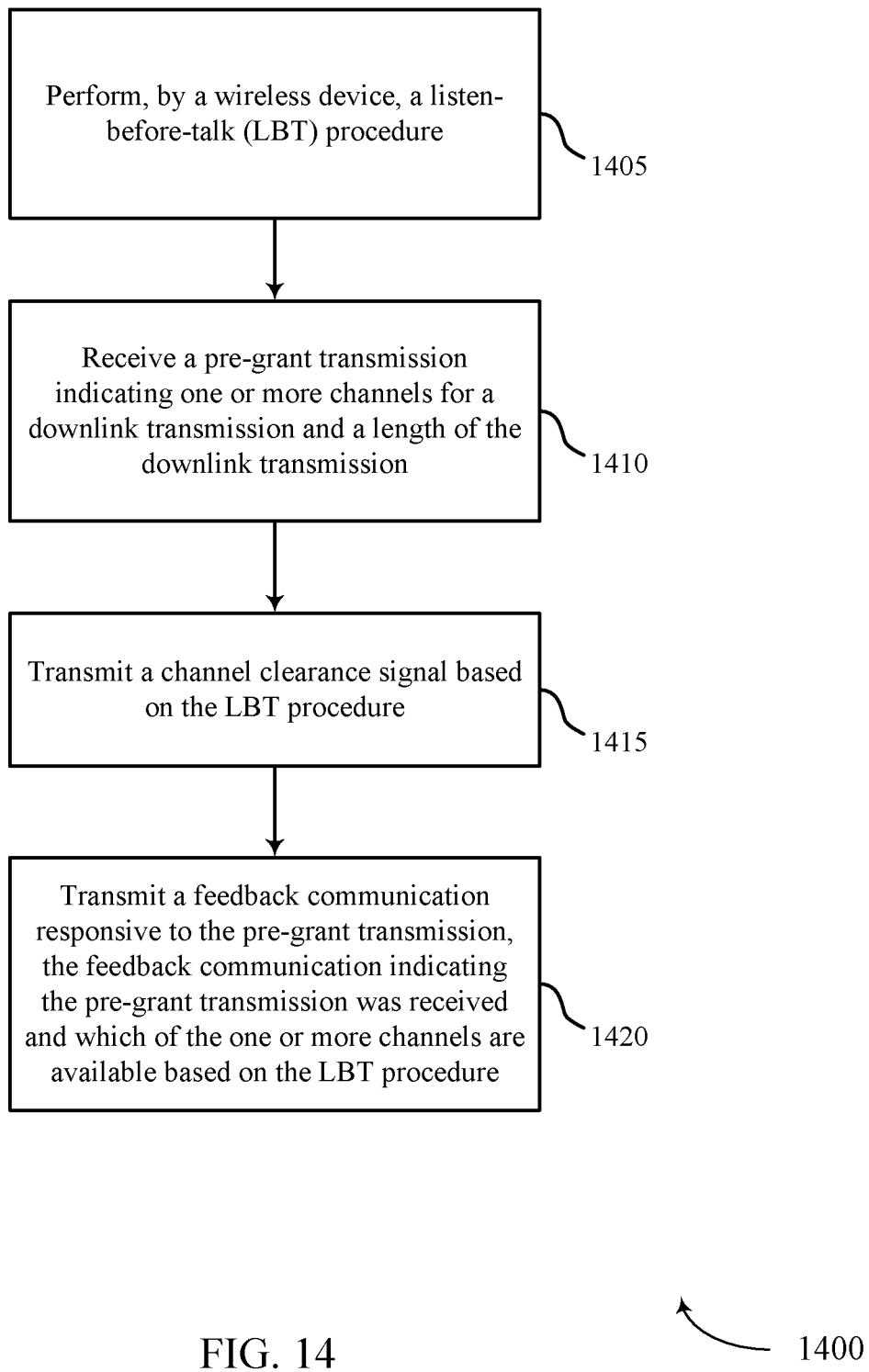
FIGS. 14-17 illustrate methods for channel clearance techniques using shared radio frequency spectrum band in accordance with various aspects of the present disclosure.

FIG. 14 shows a flowchart illustrating a method 1400 for channel clearance techniques using shared radio frequency spectrum band in accordance with various aspects of the present disclosure. The operations of method 1400 may be implemented by a UE 115 or its components as described with reference to FIGS. 1-13. For example, the operations of method 1400 may be performed by the wireless communications management module 610 as described with reference to FIGS. 6-9. In some examples, a UE 115 may execute a set of codes to control the functional elements of the UE 115 to perform the functions described below. Additionally or alternatively, the UE 115 may perform aspects the functions described below using special-purpose hardware.

At block 1405, the UE 115 may perform an LBT procedure. In some examples, the LBT procedure is performed before receiving a pre-grant transmission. In some examples, the LBT procedure is performed after receiving the pre-grant transmission received at block 1410, and may be based at least in part on the one or more channels indicated in the pre-grant transmission. The LBT procedure may be performed as described with reference to FIGS. 2-5. In certain examples, the operations of block 1405 may be performed by the LBT module 710 as described with reference to FIG. 7.

At block 1410, the UE 115 may receive a pre-grant transmission indicating one or more channels for a downlink transmission and a length of the downlink transmission, as described with reference to FIGS. 2-5. In certain examples, the operations of block 1410 may be performed by the pre-grant transmission module 705 as described with reference to FIG. 7.

At block 1415, the UE 115 may transmit a channel clearance signal based at least in part on the LBT procedure as described with reference to FIGS. 2-5. In certain examples, the operations of block 1415 may be performed by the channel clearance module 715 as described with reference to FIG. 7.

At block 1420, the UE 115 may transmit a feedback communication responsive to the pre-grant transmission, the feedback communication indicating the pre-grant transmission was received and which of the one or more channels are available based at least in part on the LBT procedure, as described with reference to FIGS. 2-5. In certain examples, the operations of block 1420 may be performed by the feedback module 720 as described with reference to FIG. 7.

Figure 15:
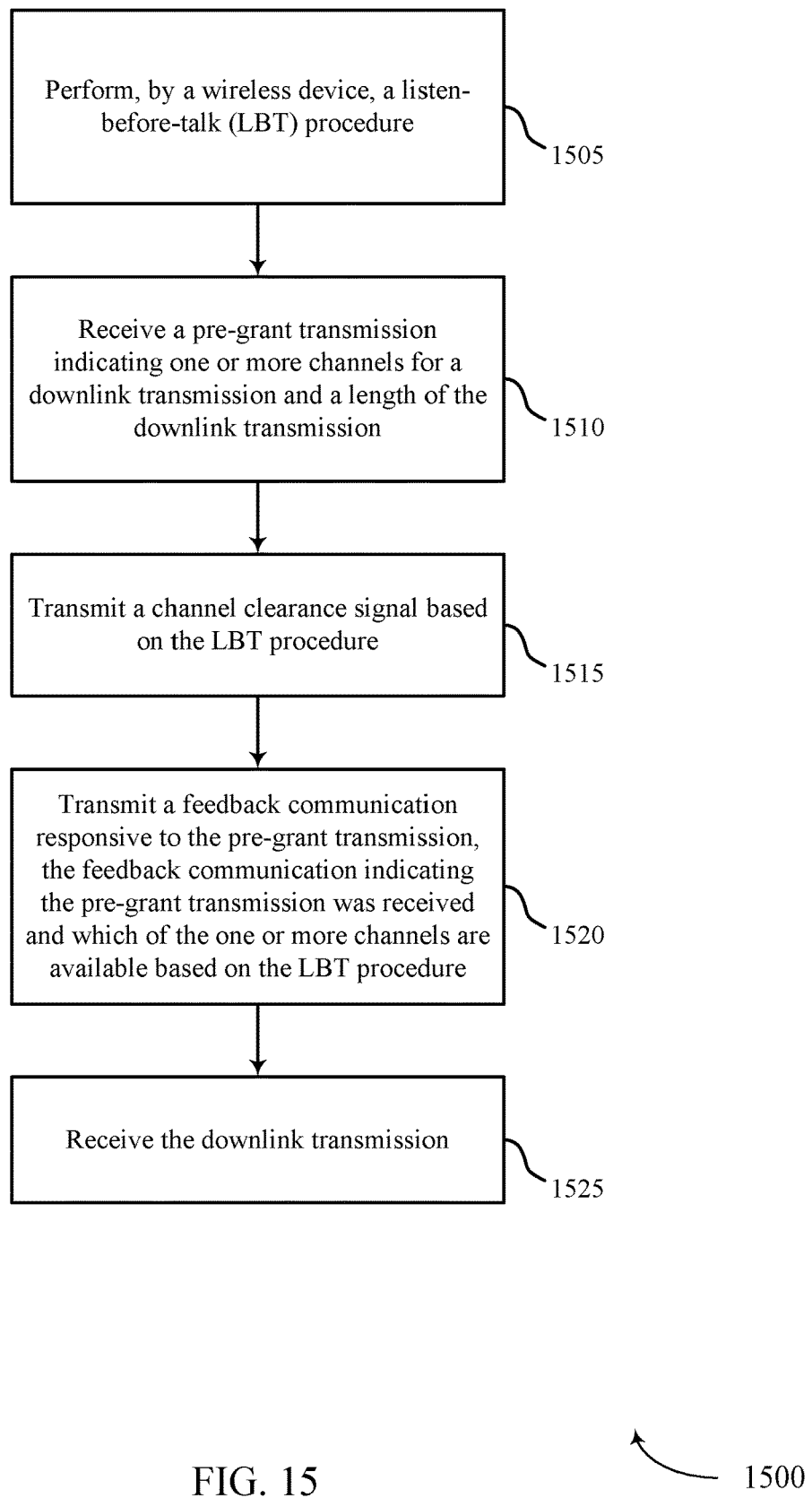

FIG. 15 shows a flowchart illustrating a method 1500 for channel clearance techniques using shared radio frequency spectrum band in accordance with various aspects of the present disclosure. The operations of method 1500 may be implemented by a UE 115 or its components as described with reference to FIGS. 1-13. For example, the operations of method 1500 may be performed by the wireless communications management module 610 as described with reference to FIGS. 6-9. In some examples, a UE 115 may execute a set of codes to control the functional elements of the UE 115 to perform the functions described below. Additionally or alternatively, the UE 115 may perform aspects the functions described below using special-purpose hardware. The method 1500 may also incorporate aspects of method 1400 of FIG. 14.

At block 1505, the UE 115 may perform an LBT procedure. In some examples, the LBT procedure is performed before receiving a pre-grant transmission. In some examples, the LBT procedure is performed after receiving the pre-grant transmission received at block 1510, and may be based at least in part on the one or more channels indicated in the pre-grant transmission. The LBT procedure may be performed as described with reference to FIGS. 2-5. In certain examples, the operations of block 1505 may be performed by the LBT module 710 as described with reference to FIG. 7.

At block 1510, the UE 115 may receive a pre-grant transmission indicating one or more channels for a downlink transmission and a length of the downlink transmission, as described with reference to FIGS. 2-5. In certain examples, the operations of block 1510 may be performed by the pre-grant transmission module 705 as described with reference to FIG. 7.

At block 1515, the UE 115 may transmit a channel clearance signal based at least in part on the LBT procedure as described with reference to FIGS. 2-5. In certain examples, the operations of block 1515 may be performed by the channel clearance module 715 as described with reference to FIG. 7.

At block 1520, the UE 115 may transmit a feedback communication responsive to the pre-grant transmission, the feedback communication indicating the pre-grant transmission was received and which of the one or more channels are available based at least in part on the LBT procedure, as described with reference to FIGS. 2-5. In certain examples, the operations of block 1520 may be performed by the feedback module 720 as described with reference to FIG. 7.

At block 1525, the UE 115 may receive the downlink transmission, as described with reference to FIGS. 2-5. In certain examples, the operations of block 1525 may be performed by the downlink transmission module 805 as described with reference to FIG. 8. In some cases, the pre-grant transmission indicates two or more channels, and the downlink transmission may be received on fewer than all of the channels indicated in the pre-grant transmission.

Figure 16:
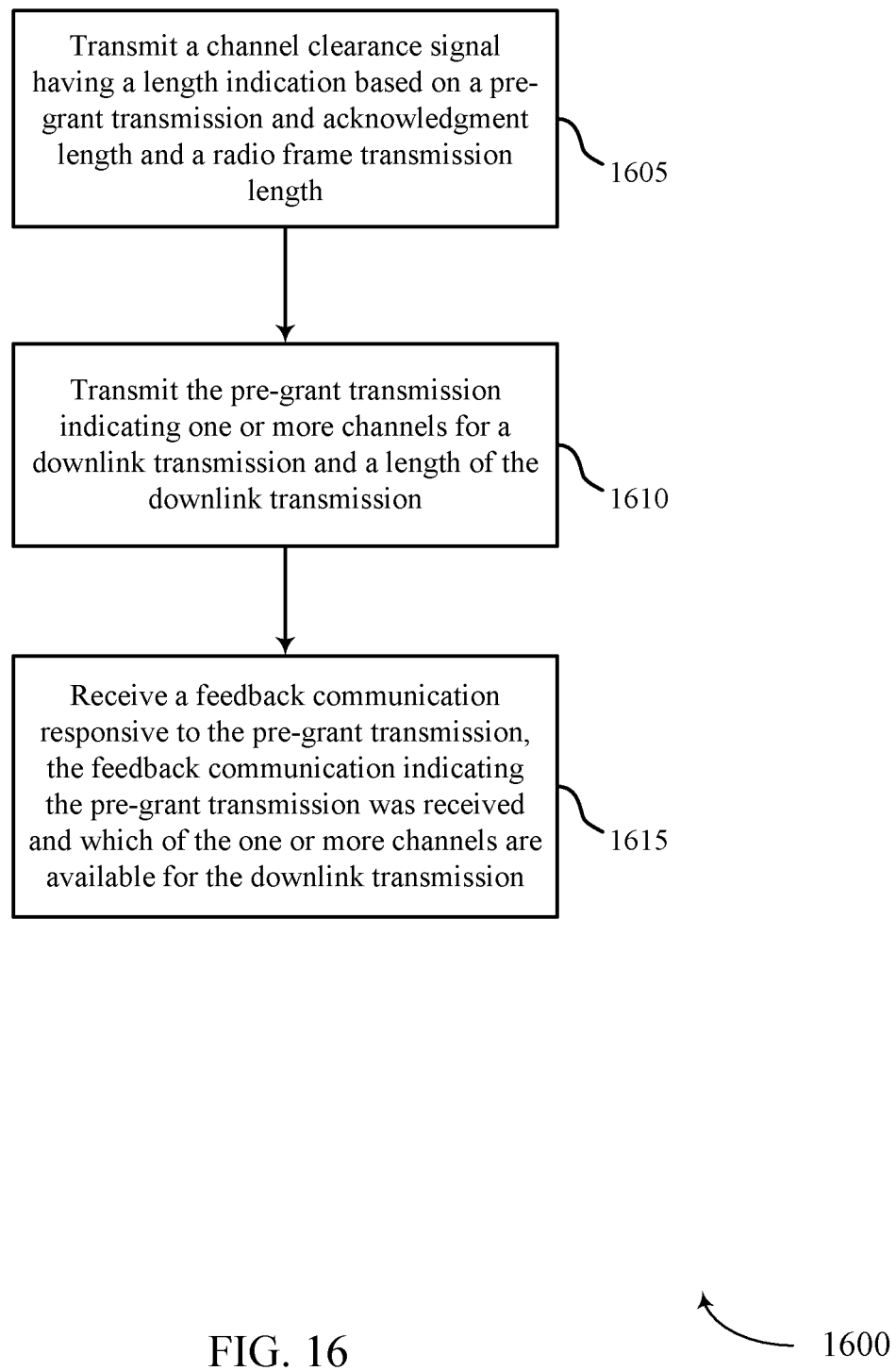

FIG. 16 shows a flowchart illustrating a method 1600 for channel clearance techniques using shared radio frequency spectrum band in accordance with various aspects of the present disclosure. The operations of method 1600 may be implemented by a base station 105 or its components as described with reference to FIGS. 1-13. For example, the operations of method 1600 may be performed by the base station wireless communications management module 1010 as described with reference to FIGS. 10-13. In some examples, a base station 105 may execute a set of codes to control the functional elements of the base station 105 to perform the functions described below. Additionally or alternatively, the base station 105 may perform aspects the functions described below using special-purpose hardware. The method 1600 may also incorporate aspects of methods 1400, and 1500 of FIGS. 14-15.

At block 1605, the base station 105 may transmit a channel clearance signal having a length indication based at least in part on a pre-grant transmission and acknowledgment length and a radio frame transmission length, as described with reference to FIGS. 2-5. In certain examples, the operations of block 1605 may be performed by the BS channel clearance module 1105 as described with reference to FIG. 11.

At block 1610, the base station 105 may transmit the pre-grant transmission indicating one or more channels for a downlink transmission and a length of the downlink transmission, as described with reference to FIGS. 2-5. In certain examples, the operations of block 1610 may be performed by the BS pre-grant transmission module 1110 as described with reference to FIG. 11.

At block 1615, the base station 105 may receive a feedback communication responsive to the pre-grant transmission, the feedback communication indicating the pre-grant transmission was received and which of the one or more channels are available for the downlink transmission, as described with reference to FIGS. 2-5. In certain examples, the operations of block 1615 may be performed by the BS feedback module 1115 as described with reference to FIG. 11.

Figure 17:
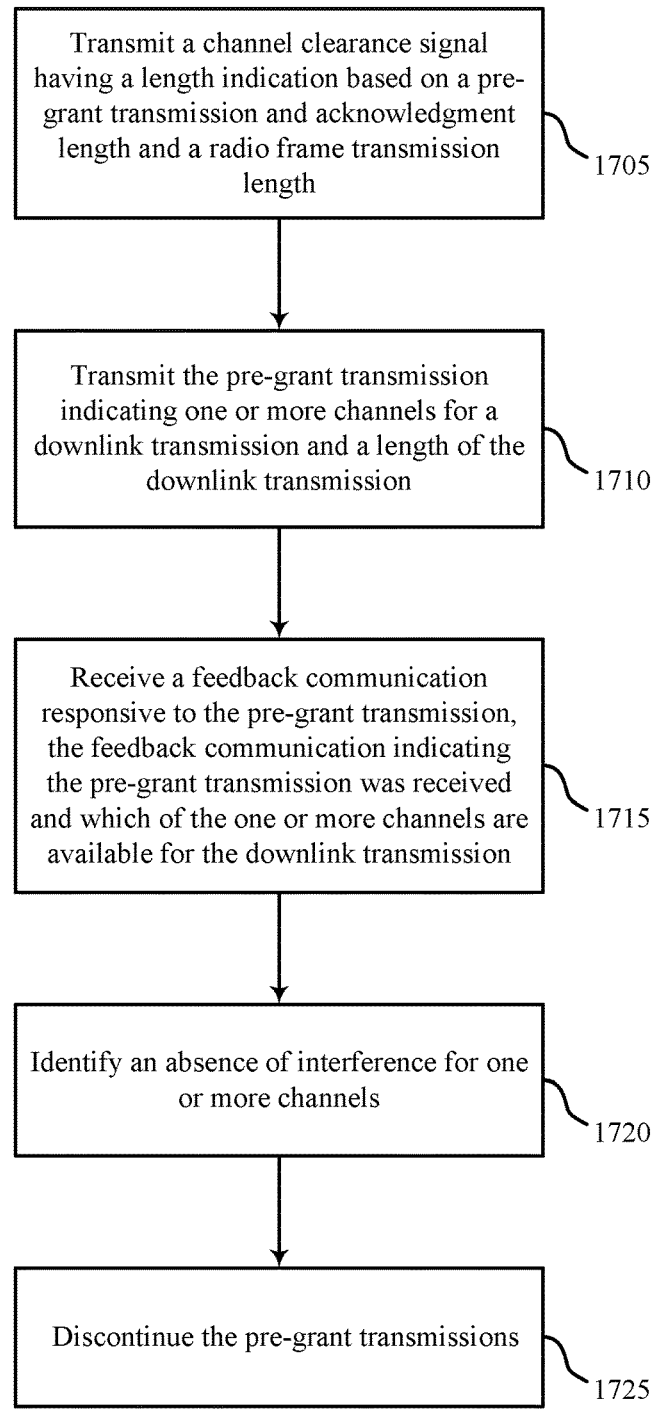

FIG. 17 shows a flowchart illustrating a method 1700 for channel clearance techniques using shared radio frequency spectrum band in accordance with various aspects of the present disclosure. The operations of method 1700 may be implemented by a base station 105 or its components as described with reference to FIGS. 1-13. For example, the operations of method 1700 may be performed by the base station wireless communications management module 1010 as described with reference to FIGS. 10-13. In some examples, a base station 105 may execute a set of codes to control the functional elements of the base station 105 to perform the functions described below. Additionally or alternatively, the base station 105 may perform aspects the functions described below using special-purpose hardware. The method 1700 may also incorporate aspects of methods 1400, 1500, and 1600 of FIGS. 14-16.

At block 1705, the base station 105 may transmit a channel clearance signal having a length indication based at least in part on a pre-grant transmission and acknowledgment length and a radio frame transmission length, as described with reference to FIGS. 2-5. In certain examples, the operations of block 1705 may be performed by the BS channel clearance module 1105 as described with reference to FIG. 11.

At block 1710, the base station 105 may transmit the pre-grant transmission indicating one or more channels for a downlink transmission and a length of the downlink transmission, as described with reference to FIGS. 2-5. In certain examples, the operations of block 1710 may be performed by the BS pre-grant transmission module 1110 as described with reference to FIG. 11.

At block 1715, the base station 105 may receive a feedback communication responsive to the pre-grant transmission, the feedback communication indicating the pre-grant transmission was received and which of the one or more channels are available for the downlink transmission, as described with reference to FIGS. 2-5. In certain examples, the operations of block 1715 may be performed by the BS feedback module 1115 as described with reference to FIG. 11.

At block 1720, the base station 105 may identify an absence of interference for one or more channels, as described with reference to FIGS. 2-5. Such an identification may be made, for example, based on an indication received from a UE that interference has not been detected for a certain time period. In certain examples, the operations of block 1720 may be performed by the feedback module 720 as described with reference to FIG. 7.

At block 1725, the base station 105 may discontinue the pre-grant transmissions, as described with reference to FIGS. 2-5. In certain examples, the operations of block 1725 may be performed by the pre-grant transmission module 705 as described with reference to FIG. 7.

Thus, methods 1400, 1500, 1600, and 1700 may provide for channel clearance techniques using shared radio frequency spectrum band. It should be noted that methods 1400, 1500, 1600, and 1700 describe possible implementation, and that the operations and the steps may be rearranged or otherwise modified such that other implementations are possible. In some examples, aspects from two or more of the methods 1400, 1500, 1600, and 1700 may be combined.

The description herein provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. Also, features described with respect to some examples may be combined in other examples.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM). An orthogonal frequency division multiple access (OFDMA) system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-advanced (LTE-a) are new releases of Universal Mobile Telecommunications System (UMTS) that use E-UTRA. UTRA, E-UTRA, Universal Mobile Telecommunications System (UMTS), LTE, LTE-a, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-a networks, including such networks described herein, the term evolved node B (eNB) may be generally used to describe the base stations. The wireless communications system or systems described herein may include a heterogeneous LTE/LTE-a network in which different types of evolved node B (eNBs) provide coverage for various geographical regions. For example, each eNB or base station may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or time division duplex (TDD) operation (e.g., using unpaired spectrum resources). Frame structures may be defined for frequency division duplex (FDD) (e.g., frame structure type 1) and TDD (e.g., frame structure type 2).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication, comprising:
   performing, by a wireless device, a listen-before-talk (LBT) procedure;
   receiving a pre-grant transmission indicating one or more channels for a downlink transmission and a length of the downlink transmission;
   transmitting a channel clearance signal based at least in part on the LBT procedure;
   monitoring channel clearance signals and their power levels for one or more channels;
   estimating a future interference level using a duration indicated in the monitored channel clearance signals and their power levels; and
   transmitting a feedback communication responsive to the pre-grant transmission and the estimated future interference level, the feedback communication indicating the pre-grant transmission was received and which of the one or more channels are available based on the LBT procedure.

2. The method of claim 1, further comprising:
   transmitting the channel clearance signal using a first waveform type; and
   transmitting the feedback communication using a second waveform type, the second waveform type is different from the first waveform type.

3. The method of claim 2, wherein the first waveform type is a Wi-Fi waveform, and the second waveform type is an orthogonal frequency division multiplexing (OFDM) waveform.

4. The method of claim 2, further comprising:
   selecting a transmission power of the channel clearance signal to clear Wi-Fi transmitters within a neighborhood of the wireless device; and
   selecting a transmission power of the feedback communication to transmit the feedback communication to a base station that generated the pre-grant transmission.

5. The method of claim 4, wherein the transmission power of the channel clearance signal is selected based on one or more of an area of the neighborhood of the wireless device or a channel quality requirement of the downlink transmission.

6. The method of claim 1, further comprising:
   receiving the downlink transmission.

7. The method of claim 6, wherein the pre-grant transmission indicates two or more channels, and the downlink transmission is received on fewer than all of the channels indicated in the pre-grant transmission.

8. The method of claim 7, wherein the downlink transmission comprises a downlink grant indicating a channel assignment and downlink data.

9. The method of claim 1, wherein the feedback communication further comprises channel quality information (CQI).

10. The method of claim 1, further comprising:
    skipping a transmission of the channel clearance signal and the feedback communication when the LBT procedure indicates each channel is occupied.

11. The method of claim 1, further comprising:
    determining an absence of interference for one or more channels for a defined time period; and
    transmitting an indication to discontinue the pre-grant transmissions.

12. The method of claim 1, further comprising:
 determining that the feedback communication is a clear channel exempt transmission (CET);
 skipping the LBT procedure;
 transmitting the channel clearance signal; and
 transmitting the feedback communication.

13. The method of claim 1, wherein the monitoring comprises monitoring Wi-Fi preambles, and wherein the estimating comprises aggregating interference levels and length information associated with the Wi-Fi preambles.

14. The method of claim 1, wherein the LBT procedure is performed after receiving the pre-grant transmission and is based at least in part on the one or more channels indicated in the pre-grant transmission.

15. The method of claim 1, wherein performing the LBT procedure is performed before receiving the pre-grant transmission and further comprises:
 periodically polling, by the wireless device, one or more channels in a shared radio frequency spectrum band to determine whether the one or more channels are available for transmissions.

16. A method for wireless communication, comprising:
 transmitting a channel clearance signal having a length indication based at least in part on a pre-grant transmission and acknowledgment length and a radio frame transmission length;
 transmitting the pre-grant transmission indicating one or more channels for a downlink transmission and a length of the downlink transmission; and
 receiving a feedback communication responsive to the pre-grant transmission and a future interference level estimated by a wireless device, the feedback communication indicating the pre-grant transmission was received and which of the one or more channels are available for the downlink transmission.

17. The method of claim 16, wherein the channel clearance signal has a first waveform type and the pre-grant transmission has a second waveform type that is different than the first waveform type.

18. The method of claim 17, wherein the first waveform type is a Wi-Fi waveform, and the second waveform type is an orthogonal frequency division multiplexing (OFDM) waveform.

19. The method of claim 16, wherein the pre-grant transmission indicates two or more channels for the downlink transmission, and wherein the method further comprises:
 determining one or more channels of the two or more channels for transmitting the downlink transmission based at least in part on the feedback communication.

20. The method of claim 19, further comprising:
 transmitting the downlink transmission using the determined one or more channels.

21. The method of claim 16, wherein the downlink transmission is transmitted on fewer than all of the channels indicated in the pre-grant transmission.

22. The method of claim 16, wherein the feedback communication is received from a plurality of user equipment (UE) devices, and wherein the downlink transmission is transmitted to fewer than all of the UE devices that transmitted the feedback communication.

23. The method of claim 16, wherein the feedback communication further comprises channel quality information (CQI).

24. The method of claim 23, further comprising:
 determining a modulation and coding scheme (MCS) for the downlink transmission based at least in part on the CQI.

25. The method of claim 16, further comprising:
 identifying an absence of interference for one or more channels; and
 discontinuing the pre-grant transmissions.

26. The method of claim 25, wherein the identifying the absence of interference comprises:
 receiving a communication from a wireless device indicating an absence of interference for a defined period of time.

27. The method of claim 16, further comprising:
 determining that one or more user equipment (UE) to receive the pre-grant transmission does not indicate that one or more channels are available for transmission; and
 initiating a new pre-grant transmission directed to one or more different UEs.

28. An apparatus for communication at a wireless device, comprising:
 a processor;
 memory in communication with the processor; and
 instructions stored in the memory; wherein the instructions are executable by the processor to:
  perform, by a wireless device, a listen-before-talk (LBT) procedure;
  receive a pre-grant transmission indicating one or more channels for a downlink transmission and a length of the downlink transmission;
  transmit a channel clearance signal based at least in part on the LBT procedure;
  monitor channel clearance signals and their power levels for one or more channels;
  estimate a future interference level using a duration indicated in the monitored channel clearance signals and their power levels; and
  transmit a feedback communication responsive to the pre-grant transmission and the estimated future interference level, the feedback communication indicating the pre-grant transmission was received and which of the one or more channels are available based on the LBT procedure.

29. An apparatus for communication at a wireless device, comprising:
 a processor;
 memory in communication with the processor; and
  instructions stored in the memory; wherein the instructions are executable by the processor to:
  transmit a channel clearance signal having a length indication based at least in part on a pre-grant transmission and acknowledgment length and a radio frame transmission length;
  transmit the pre-grant transmission indicating one or more channels for a downlink transmission and a length of the downlink transmission; and
  receive a feedback communication responsive to the pre-grant transmission and a future interference level estimated by a wireless device, the feedback communication indicating the pre-grant transmission was received and which of the one or more channels are available for the downlink transmission.

\* \* \* \* \*